US012639093B2

(12) United States Patent
Lu et al.

(10) Patent No.: US 12,639,093 B2
(45) Date of Patent: May 26, 2026

(54) VIRTUALIZATION METHOD, DEVICE, BOARD CARD AND COMPUTER-READABLE STORAGE MEDIUM

(71) Applicant: Anhui Cambricon Information Technology Co., Ltd., Hefei (CN)

(72) Inventors: Haibo Lu, Hefei (CN); Fangxiao Fu, Hefei (CN); Yu Yang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 702 days.

(21) Appl. No.: 17/904,824

(22) PCT Filed: Feb. 25, 2021

(86) PCT No.: PCT/CN2021/077977
§ 371 (c)(1),
(2) Date: Aug. 23, 2022

(87) PCT Pub. No.: WO2021/170054
PCT Pub. Date: Sep. 2, 2021

(65) Prior Publication Data
US 2023/0111884 A1 Apr. 13, 2023

(30) Foreign Application Priority Data

Feb. 28, 2020 (CN) .......................... 202010131483.4
Apr. 29, 2020 (CN) .......................... 202010358635.4

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS 9,384,060 B2 * 7/2016 Hunter ................. G06F 9/4411
2017/0329644 A1 11/2017 Imamura
(Continued)

FOREIGN PATENT DOCUMENTS

CN 107463402 A 12/2017
CN 109983438 A 7/2019
(Continued)

OTHER PUBLICATIONS

CN202010358635.4—First Office Action malled on Nov. 30, 2024, 16 pages.
(Continued)

*Primary Examiner* — Eric C Wai
(74) *Attorney, Agent, or Firm* — Getech Law LLC; Jun Ye

(57) ABSTRACT

The present disclosure provides a virtualization method, a system, an electrical device and a computation apparatus based on a multi-core processor. The computation apparatus is included in a combined processing apparatus, which also includes a general interconnection interface and other processing apparatuses. The computation apparatus interacts with other processing apparatuses to jointly complete computation operations specified by the user. The combined processing apparatus also includes a storage apparatus, which is respectively connected to the computation apparatus and other processing apparatuses and is used for storing data of the computation apparatus and other processing apparatuses.

11 Claims, 33 Drawing Sheets

(56)                    References Cited

U.S. PATENT DOCUMENTS

2017/0344391 A1     11/2017   Alvarez et al.
2018/0219982 A1*     8/2018   Surcouf ................. H04L 41/40

FOREIGN PATENT DOCUMENTS

CN          110427246  A    11/2019
CN          110569101  A    12/2019
CN          110659245  A     1/2020
WO          2017028317 A1    2/2017
WO          2019058874 A1    3/2019

OTHER PUBLICATIONS

PCT/CN2017/077977—International Search Report and Written
Opinion, mailed May 21, 2021, 13 pages.
CN202010131483.4—First Office Action mailed on Jul. 11, 2025,
18 pages.
Vu et al., "Enabling Partial Reconfiguration For Coprocessors In
Mixed Criticality Multicore Systems Using PCI Express Single-root
I/O Virtualization", 2014 International Conference on ReConFigur-
able Computing and FPGAs, Dec. 31, 2014, 6 pages.

* cited by examiner

Divide the multi-core processor to a plurality of virtual functions, and each virtual function corresponds to one or a plurality of processing cores          1-S310

Map the virtual function to a container, and each container may operate independently          1-S320

| Processing cluster 0 | Processing cluster 1 | Processing cluster 2 | Processing cluster 3 | |
|---|---|---|---|---|
| Virtual function 0 | | | | Example 1 |
| Virtual function 0 | | | Virtual function 1 | Example 2 |
| Virtual function 0 | | Virtual function 1 | | Example 3 |
| Virtual function 0 | | Virtual function 1 | Virtual function 0 | Example 4 |
| Virtual function 0 | Virtual function 1 | Virtual function 2 | Virtual function 3 | Example 5 |
| Virtual function 0 | Virtual function 1 | | | Example 6 |
| Virtual function 0 | Virtual function 1 | Virtual function 0 | Virtual function 1 | Example 7 |
| Virtual function 0 | Virtual function 1 | Virtual function 0 | Virtual function 2 | Example 8 |

FIG. 6

Divide the multi-core processor to a plurality of virtual functions, and each virtual function corresponds to one or a plurality of processing cores

2-S310

Map the virtual function to a virtual machine

2-S320

| Processing cluster 0 | Processing cluster 1 | Processing cluster 2 | Processing cluster 3 | |
|---|---|---|---|---|
| Virtual function 0 | | | | Example 1 |
| Virtual function 0 | | | Virtual function 1 | Example 2 |
| Virtual function 0 | | Virtual function 1 | | Example 3 |
| Virtual function 0 | | Virtual function 1 | Virtual function 0 | Example 4 |
| Virtual function 0 | Virtual function 1 | Virtual function 2 | Virtual function 3 | Example 5 |
| Virtual function 0 | Virtual function 1 | | | Example 6 |
| Virtual function 0 | Virtual function 1 | Virtual function 0 | Virtual function 1 | Example 7 |
| Virtual function 0 | Virtual function 1 | Virtual function 0 | Virtual function 2 | Example 8 |

FIG. 21

Divide the multi-core processor into a plurality of virtual functions, and the plurality of virtual functions may share the plurality of processing cores

S1210

Map the virtual function to the container

S1220

VIRTUALIZATION METHOD, DEVICE, BOARD CARD AND COMPUTER-READABLE STORAGE MEDIUM

CROSS REFERENCE OF RELATED APPLICATION

This is a 371 of International Application No. PCT/CN2021/077977, filed Feb. 25, 2021, which claims priority to Chinese Patent Application No. 202010131483.4 with the title of "Virtualization method, system, multi-core processor and electronic device based on multi-core processor" filed on Feb. 28, 2020, and the present application claims priority to Chinese Patent Application No. 202010358635.4 with the title of "Virtualization method, system, multi-core processor and electronic device based on multi-core processor" field on Apr. 29, 2020, and the content of which is incorporated herein by reference in its entirety.

TECHNICAL FIELD

The present disclosure relates to the fields of artificial intelligence, and in particular to a virtualization technology of a processor.

BACKGROUND

In computer field, virtualization is a resource management technology that abstracts, converts and then presents every kinds of computer resources such as server, network, memory and storage. Virtualization enables the user to apply such resources in a better manner than an original configuration.

FIG. 1 is a schematic block diagram of realizing virtualization through a time slicing technology.

As shown in FIG. 1, there are four virtual machines VM0 to VM3, which may perform their own tasks respectively. These tasks may form time slicing and are sorted according to time after passing through a time slicing manager. A computing engine may process different tasks (time-sharing tasks) according to the time slicing. Under this mode, when the virtual machine VM1 works, other virtual machines may not work but in a waiting time. When the time slicing is small, it may not be easy for the user to notice time latency. However, if a task of a virtual machine takes a large amount of time (such as the VM1 shown in FIG. 1), other users may notice obvious time latency, which may affect user experience.

Besides, in the prior art, the computing engine is public to different virtual machines, and once a virtual machine causes problems to the computing engine, all the virtual machines may be affected, thereby affecting all the users.

Therefore, existing virtual machine solutions have such defects as low computation efficiency, HOL (Head-of-line) blocking, high adjacent noise, and difficulty in extending.

SUMMARY 202010131483.4 The purpose of the present disclosure is to provide a virtualization method and system that may overcome at least one defect in the prior art, and the virtualization method and system is based on a multi-core processor.

A first aspect of the present disclosure provides a virtualization method based on the multi-core processor. The multi-core processor includes a plurality of processing cores. The method includes: dividing the multi-core processor to a plurality of virtualization functions, where each virtualization function corresponds to one or a plurality of processing cores; and mapping the virtualization function to a container.

A second aspect of the present disclosure provides a virtualization system. The virtualization system includes a multi-core processor that includes a plurality of processing cores; a plurality of virtualization functions, where each virtualization function corresponds to one or a plurality of processing cores; and a container that corresponds to the virtualization function.

A third aspect of the present disclosure provides a multi-core processor that includes a plurality of processing cores, where the multi-core processor is divided into a plurality of virtualization functions, where each virtualization function corresponds to one or a plurality of processing cores.

A fourth aspect of the present disclosure provides an electronic device, which includes the above mentioned virtualization system or the above mentioned multi-core processor.

A fifth aspect of the present disclosure provides a computer-readable storage medium, on which computer program code is stored. The above mentioned method may be implemented when the computer program code is run by the processor.

The present disclosure may realize at least one of the following technical effects:

Quality of Service (QoS);

no HOL blocking;

no adjacent noise;

no context switch overhead;

easy to be extended and deployed. 202010131483.4

202010358635.4 The purpose of the present disclosure is to provide a virtualization method and system that may overcome at least one defect in the prior art, and the virtualization method and system is based on a multi-core processor.

A sixth aspect of the present disclosure provides a virtualization method based on the multi-core processor, where the multi-core processor includes a plurality of processing cores. The method includes: dividing the multi-core processor to a plurality of virtualization functions, where each virtualization function corresponds to one or a plurality of processing cores; and mapping the virtualization function to a virtual machine.

A seventh aspect of the present disclosure provides a virtualization method based on the multi-core processor, where the multi-core processor includes a plurality of processing cores. The method includes: dividing the multi-core processor to a plurality of virtualization functions, where the plurality of virtualization functions share the plurality of processing cores; and mapping the virtualization function to a container.

An eighth aspect of the present disclosure provides a virtualization system. The virtualization system includes a multi-core processor that includes a plurality of processing cores; a plurality of virtualization functions that share the plurality of processing cores; and a virtual machine that corresponds to the virtualization function.

A ninth aspect of the present disclosure provides a virtualization system. The virtualization system includes a multi-core processor that includes a plurality of processing cores; a plurality of virtualization functions that share the plurality of processing cores; and a container that corresponds to the virtualization function.

A tenth aspect of the present disclosure provides a multi-core processor that includes a plurality of processing cores, where the multi-core processor is divided into a plurality of virtualization functions, where the plurality of virtualization functions share one or a plurality of processing cores.

An eleventh aspect of the present disclosure provides an electronic device, which includes the above mentioned virtualization system or the above mentioned multi-core processor.

A twelfth aspect of the present disclosure provides a computer-readable storage medium, on which computer program code is stored. The above mentioned method may be implemented when the computer program code is run by the processor.

The present disclosure may realize at least one of the following technical effects:

Quality of Service (QoS);

no HOL blocking no adjacent noise;

no context switch overhead;

easy to be extended and deployed. 202010358635.4

BRIEF DESCRIPTION OF THE DRAWINGS

By reading the following detailed description with reference to the accompanying drawings, the above-mentioned and other objects, features and technical effects of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

FIG. 6 is a schematic diagram of a correspondence between a virtualization function and a processing cluster, according to an embodiment of the present disclosure;

FIG. 21 is a schematic diagram of a correspondence between a virtualization function and a processing cluster, according to an embodiment of the present disclosure;

Figure 1:
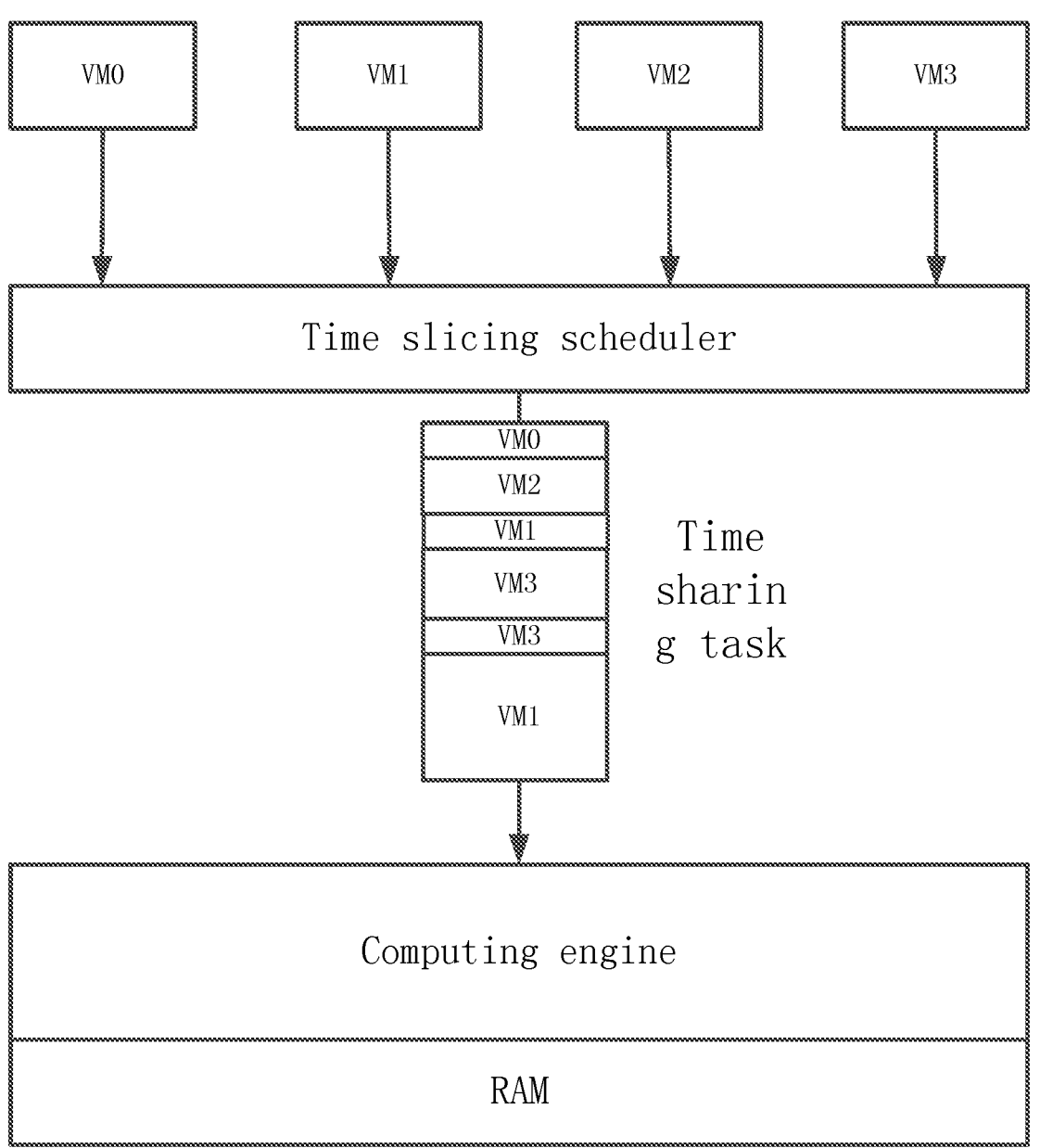
FIG. 1 is a schematic block diagram of realizing virtualization through a time slicing technology.

DETAILED DESCRIPTION OF THE EMBODIMENTS 202010131483.4 Technical solutions in embodiments of the present disclosure will be described clearly and completely hereinafter with reference to the accompanied drawings in the embodiments of the present disclosure. Obviously, the embodiments to be described are merely some rather than all embodiments of the present disclosure. All other embodiments obtained by those skilled in the art based on the embodiments of the present disclosure without creative efforts shall fall within the protection scope of the present disclosure.

It should be understood that terms such as "the first", "the second", "the third", and "the fourth" appear in the claims, the specification, and the drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claim of the present disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claim, the term "if" may be interpreted as "when", or "once" or "in response to a determination" or "in response to a case where something is detected" depending on the context. Similarly, depending on the context, the clause "if it is determined that" or "if [a described condition or event] is detected" may be interpreted as "once it is determined that", or "in response to a determination", or "once [a described condition or event] is detected", or "in response to a case where [a described condition or event] is detected".

Further, in the specification and the claim of the present disclosure, the correspondence between two parts may be understood as a connection relation, a response relation or a matching relation between two parts.

Virtualization is a technology that may virtualize a computer device to a plurality of virtual machines. When the plurality of virtual machines are run on one computer at the same time, each virtual machine may run the same or different operating systems. Applications running on the operating systems may run in separate space without affecting each other, thus significantly increasing working efficiency of the computer.

The virtualization technology is different form a multi-task or a hyper-threading technology. The multi-task refers to running a plurality of programs in one operating system at the same time. However, in the virtualization technology, the plurality of operating systems may be run at the same time, where each operating system contains a plurality of running programs, and each operating system is run on a virtual machine. The hyper-threading technology means that a uniprocessor simulates two processors to balance the operating performance of a program, where these two simulated processors may not be separated, but may only work together. However, in the virtualization technology, a virtual processor may work independently.

The virtualization technology usually uses software to redefine and divide physical resource of the computer, so as to realize dynamic allocation, flexible schedule and cross-domain sharing of the computer resource, thereby improving resource utilization.

Figure 2:
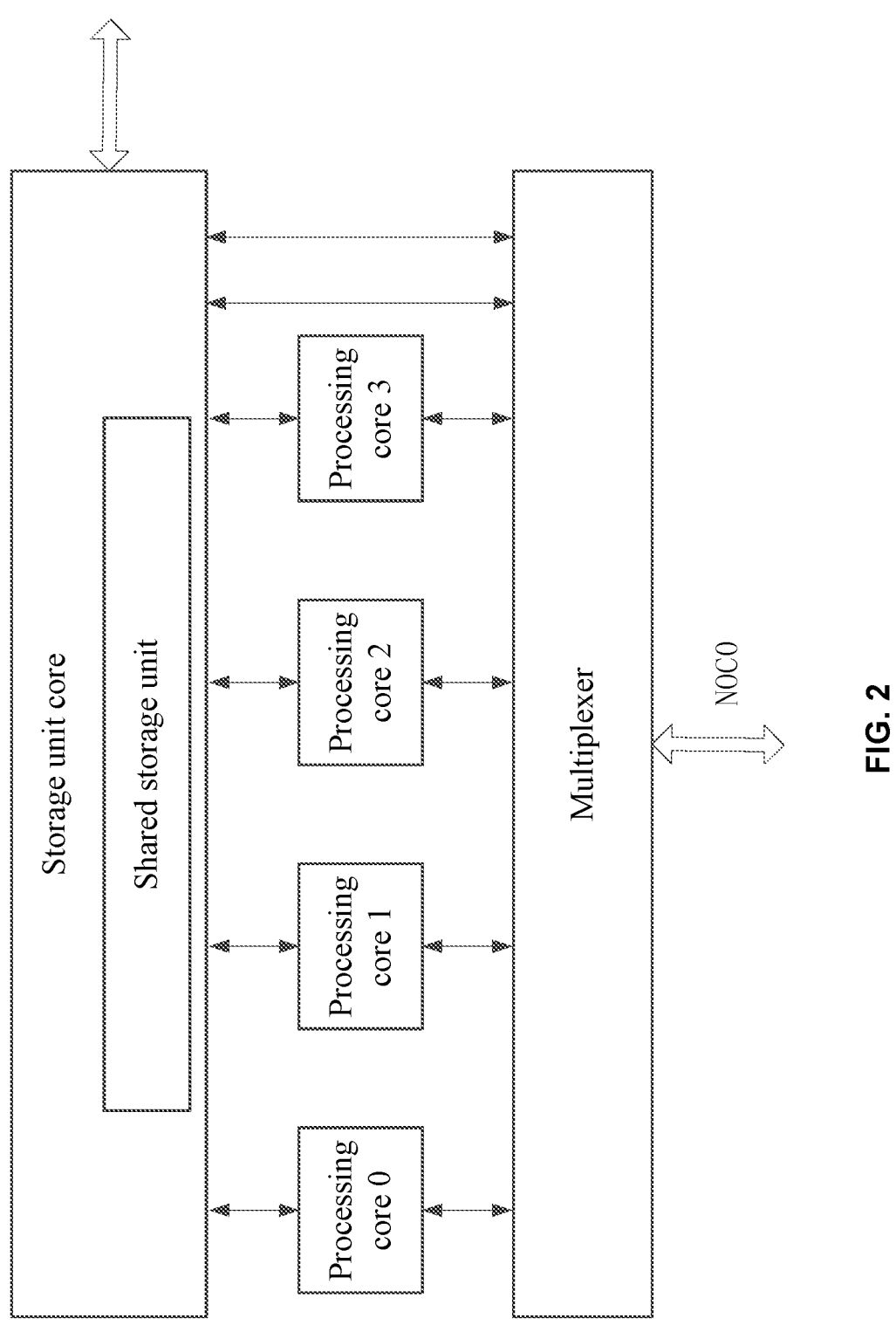
FIG. 2 is a schematic diagram of an internal structure of a processing cluster to which the method of the present disclosure may be applied.

FIG. 2 is a schematic diagram of an internal structure of a processing cluster to which the methods of the present disclosure may be applied.

The artificial intelligence (AI) chip accelerates computation capability of data, thereby decreasing memory accessing delay. The artificial intelligence chip adopts a multi-core processor architecture, and adds storage unit core (which may also be called as a on-chip storage unit) to accelerate data reading, solving the bottleneck problem of memory accessing of the processing cores of the artificial intelligence chip and DDR (double data rate) (which may also be called as off-chip storage unit), and providing high computation capability in scenarios such as deep learning and network computation.

The artificial intelligence chip, for example, may have 16 processing cores configured to perform computational tasks. Every four processing cores constitute one processing cluster, so that there are four processing clusters. Every processing cluster has an inner storage unit core. The storage unit core is mainly configured to exchange data between a shared storage unit in the processing cluster and the processing cores, and exchange data among processing clusters. When the storage unit core and the processing core access the DDR at the same time, arbitration by the multiplexer may assure that only one group of bus may access the DDR.

Figure 3:
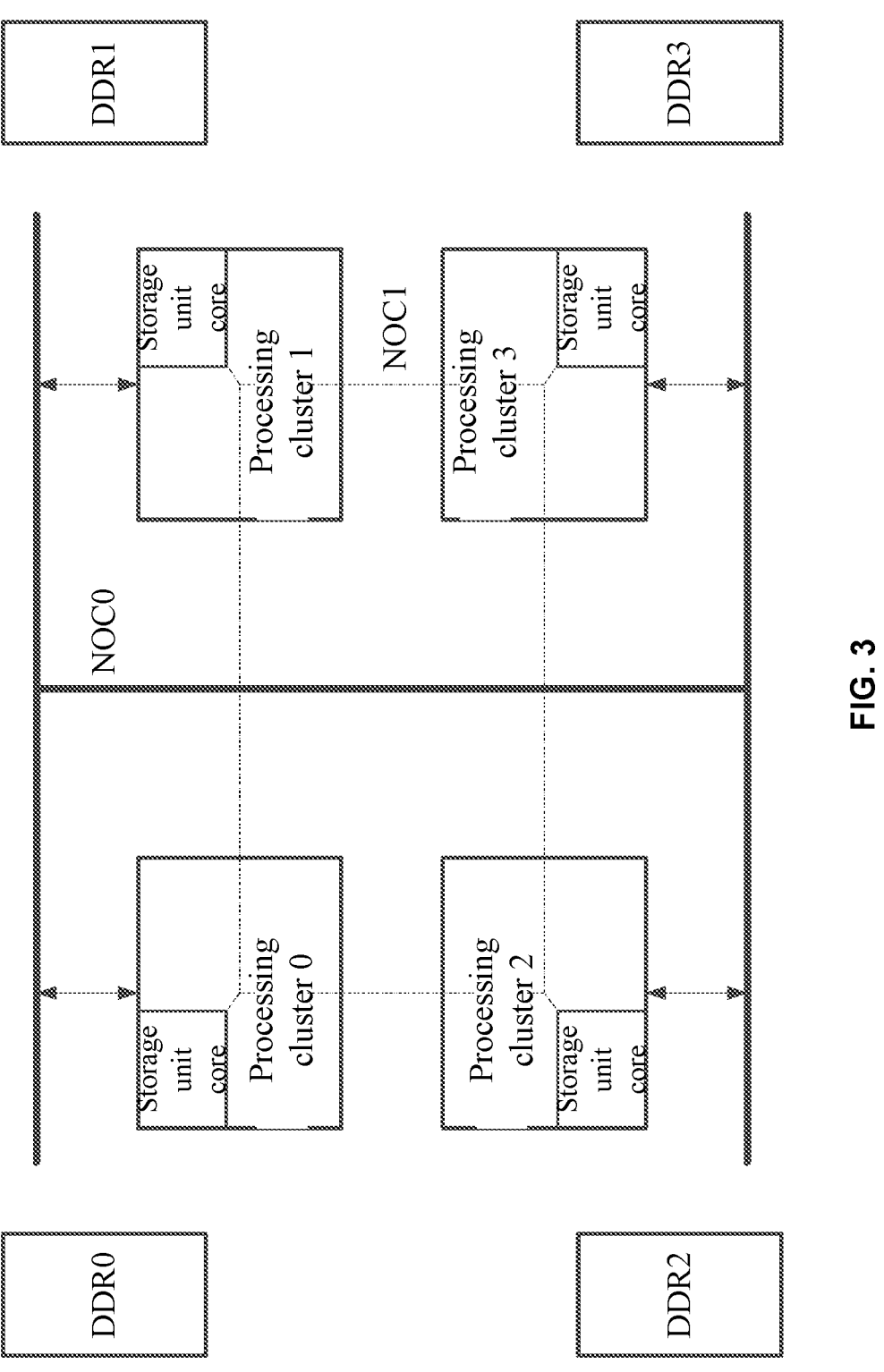
FIG. 3 is a structural diagram of an artificial intelligence processor to which the method of the present disclosure may be applied.

FIG. 3 is a structural diagram of an artificial intelligence processor to which the method of the present disclosure may be applied to.

The DDR of the artificial intelligence chip adopts a NUMA (non-uniform memory access) architecture. Each processing cluster may access different DDR channels through NOC0 (network-on-chip), but the latency to access different DDR channels is different. Each processing cluster corresponds to a DDR channel with the lowest access latency, and the latency is relatively long when the processing cluster accessing other channels. As shown in the structural diagram of the processing cluster and the DDR in FIG. 1-1*b*, a processing cluster 0, a processing cluster 1, a processing cluster 2 and a processing cluster 3 may have the lowest latency when they respectively access corresponding DDR0, DDR1, DDR2 and DDR3. In other words, each processing cluster accesses the DDR channel with the lowest memory access latency for its respective processing cluster.

A memory access bandwidth in the processing cluster is relatively wider than the access bandwidth between the processing core and the DDR, so that the artificial intelligence chip may adopt the processing cluster to realize inner access of the shared storage unit, reducing the access of the processing core to the DDR, thereby improving data throughput.

When four cores are required to perform computation in parallel, the storage unit cores may broadcast data from the shared storage unit to the four processing cores within the processing cluster simultaneously for data computation by adopting data broadcasting method (via NOC1). Compared with the method that all the processing clusters read data through the DDR, the above mentioned method may decrease the memory access latency and optimize computational performance.

If the virtualization is implemented through traditional method, all the virtual machines may share all the four processing clusters. When there are few tasks, some processing clusters may be in vacancy, causing a waste of resources.

The environment in which the technical solutions of the present disclosure is applied is described above, and the following may describe a plurality of implementations of the present disclosure in detail. Combined with FIG. 4 and FIG. 5, the following may describe specific implementations of the present disclosure.

Figure 4:
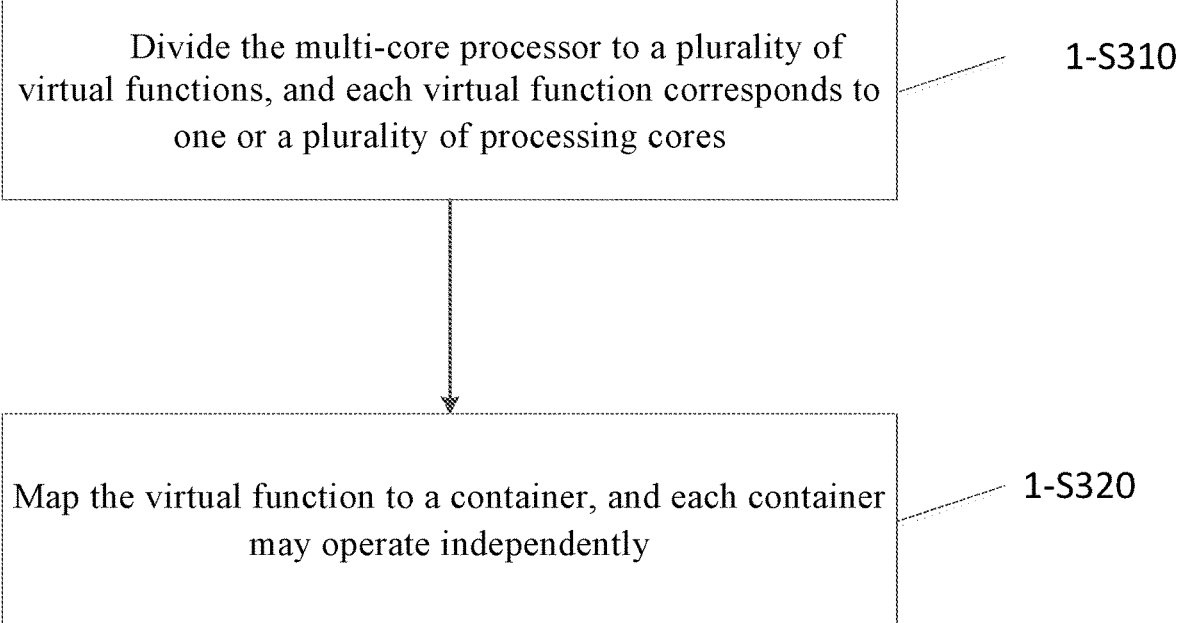
FIG. 4 is a virtualization method based on a multi-core processor, according to a first aspect of the present disclosure.

FIG. 4 shows a virtualization method based on the multi-core processor, such as an artificial intelligence processor, provided in the first aspect of the present disclosure. The multi-core processor includes a plurality of processing cores. The method includes: dividing the multi-core processor to a plurality of virtual functions in step 1-S310, where each virtual function corresponds to one or a plurality of processing cores; and in operation 1-S320, mapping the virtual function to a container.

Figure 5:
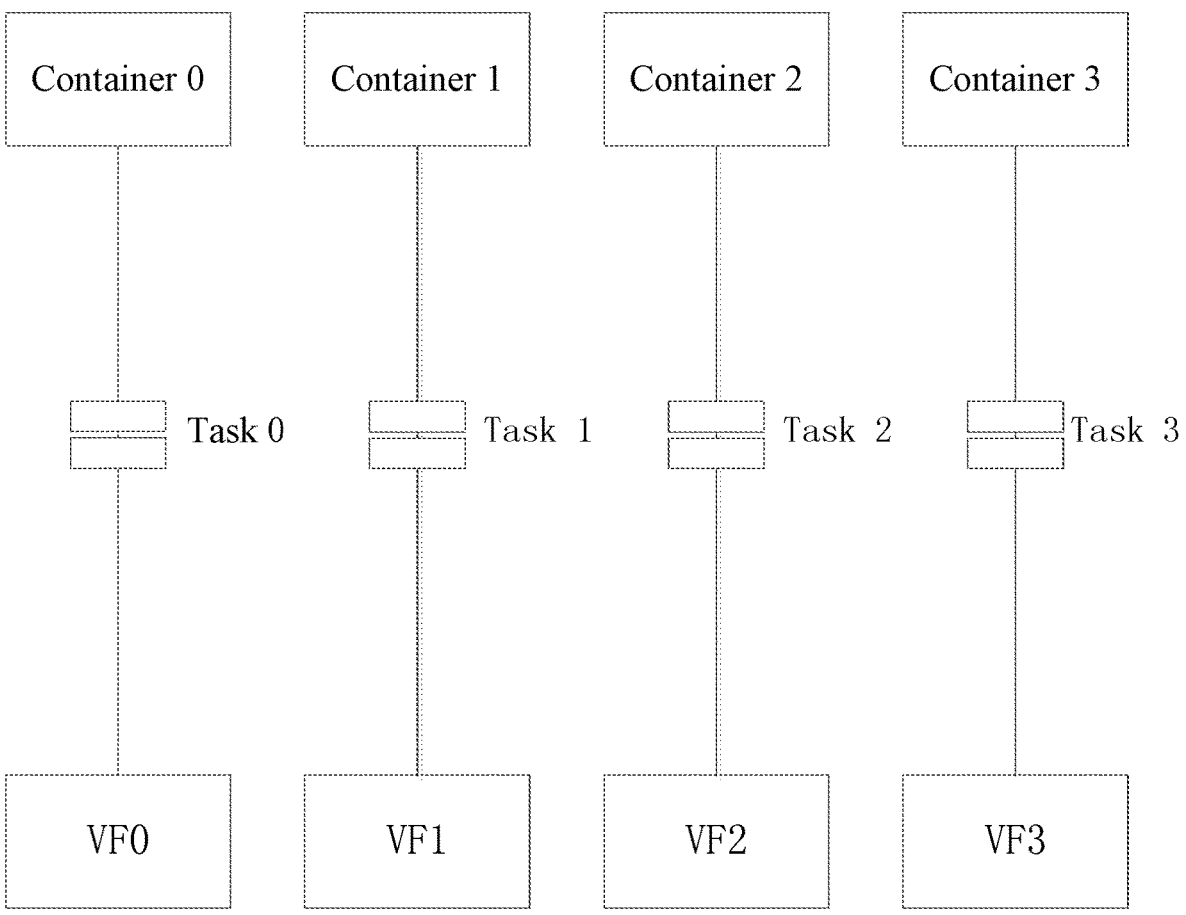
FIG. 5 is a virtualization system, according to an embodiment of the present disclosure.

FIG. 5 shows a virtualization system according to an embodiment of the present disclosure. The virtualization system includes a multi-core processor that includes a plurality of processing cores; a plurality of virtualization functions VF0 to VF3, where each virtualization function corresponds to one or a plurality of processing cores; and a container (container 0 to container 3) that corresponds to the virtualization function.

The above methods and systems may be implemented through SR-IVO (single root I/O virtualization) technology. The SR-IOV technology is a virtualization solution based on hardware that may provide high performance and scalability. SR-IOV develops a standardized mechanism to enable the plurality of virtual machines share the same I/O device. Therefore, PCIe (peripheral component interconnect express) device may be shared efficiently among virtual machines, and an I/O performance similar to this machine may be obtained.

SR-IOV may be divided to the following two function types:

PF (physical function), which has a PCI function and is configured to support SR-IOV function, such as what is defined in SR-IOV norms; PF includes an SR-IOV functional structure and is configured to manage the SR-IOV function; PF is a full-featured PCIe function, and may discover, manage and process like any other PCIe devices; PF has fully configured resources and may be configured to allocate or control the PCIe device.

VF (virtual function), which is a function related to the PF; VF is a lightweight PCIe function, and may share physical resources with other VF in the same PCIe device and PF; The VF only has the allocated resources for its own behavior.

Each SR-IOV device may have one PF, and each PF may have a plurality of VFs that may be related to the PF. Each VF may have one PCI memory space configured to map a register set of the VF. VF device driver may operate on the register set to enable a function of the register set, and realize the register set to an actual PCI device. After being created, the VF may be directly appointed to a guest virtual machine VM. Therefore, the VF may share the same physical device, and may perform data input and output when application software overhead is not managed by a CPU (central processing unit) or the virtual machine.

It should be understood that the above mentioned same physical device refers to different hardware resources on the same physical device. The physical device, for example, may be a multi-core processor, and the hardware resources may be different processing cores on the physical device.

This shows that there may be one or a plurality of virtual functions. When there is one virtual function, all the processing cores in the multi-core processor may be divided into single virtual function; and when there are a plurality of virtual functions, the containers may operate independently. Independent operation means that each container is isolated from each other, and may operate without depending on other containers, and may not be affected by other containers. Besides, isolation of the present disclosure is based on hardware, so that there is less interference among the containers. Besides, independent operation means that each container adopts different operating system without affecting each other.

Virtual function may perform the same work as the multi-core processor. The virtual function is obtained through logical division of the multi-core processor. The virtual function may include one or a plurality of processing cores. The more the processing cores, the stronger the computation capability of the virtual function. All the processing cores may be divided into one virtual function.

As shown in FIG. 4 and FIG. 5, the virtual function may correspond to the container. For example, a virtual function VF0 may correspond to a container 0, a virtual function VF1 may correspond to a container 1, a virtual function VF2 may correspond to a container 2, and a virtual function VF3 may correspond to a container 3. It should be understood that the correspondence is only an example, and the present disclosure may also adopt other correspondence to make system deployment more convenient. This will be described in detail later. Besides, even though four virtual functions and four containers have been described in FIG. 5, the number of virtual functions and containers may be less or more.

In the present disclosure, the container contains required hardware resources and software resources for task execution (such as task 0 to task 3), and the containers may operate independently without interfering each other. Compared with a virtualization solution that adopts time slicing technology in the prior art, the technical solution in the present disclosure adopts containers that operate independently, so that there may be no HOL blocking among containers, and the containers may not be affected by adjacent noise, and there is no context switch overhead.

As shown in FIG. 2 and FIG. 3, in the multi-core processor, a certain number of processing cores constitute one processing cluster. Therefore, each virtual function may correspond to one or a plurality of processing clusters.

FIG. 6 is a schematic diagram of a correspondence between a virtualization function and a processing cluster according to an embodiment of the present disclosure. It should be understood that even though FIG. 6 describes four processing clusters (a processing cluster 0 to a processing cluster 3) as examples, the number of processing cluster is arbitrary.

In example 1 shown in FIG. 6, the processing cluster 0, the processing cluster 1, the processing cluster 2 and the processing cluster 3 correspond to the virtual function 0; in other words, the multi-core processor is divided into one virtual function.

In example 2 shown in FIG. 6, the processing cluster 0, the processing cluster 1, the processing cluster 2 and the processing cluster 3 correspond to the virtual function 1; in other words, the multi-core processor is divided into two virtual functions, and the virtual function 0 may have stronger processing capacity compared with the virtual function 1.

In example 3 shown in FIG. 6, the processing cluster 0 and the processing cluster 1 correspond to the virtual function 0, and the processing cluster 2 and the processing cluster 3 correspond to the virtual function 1; in other words, the multi-core processor is divided into two virtual functions, and the virtual function 0 may have the same processing capacity with the virtual function 1.

In example 4 shown in FIG. 6, the processing cluster 0 and the processing cluster 1 correspond to the virtual function 0, the processing cluster 2 corresponds to the virtual function 1, and the processing cluster 3 corresponds to the virtual function 2; in other words, the multi-core processor is divided into three virtual functions, the virtual function 0 may have stronger processing capacity compared with the virtual function 1 and the virtual function 2, and the virtual function 1 and the virtual function 2 may have the same processing capacity.

In example 5 shown in FIG. 6, the processing cluster 0 corresponds to the virtual function 0, the processing cluster 1 corresponds to the virtual function 1, the processing cluster 2 corresponds to the virtual function 2, and the processing cluster 3 corresponds to the virtual function 3. These four virtual functions have the same processing capacity.

In example 6 shown in FIG. 6, the processing cluster 0 corresponds to the virtual function 0, and the processing cluster 1, the processing cluster 2 and the processing cluster 3 correspond to the virtual function 1. The virtual function 0 may have poorer processing capacity compared with virtual function 0. This example is equivalent to example 2.

In example 7 shown in FIG. 6, the processing cluster 0 corresponds to the virtual function 0, the processing cluster 1 corresponds to the virtual function 1, the processing cluster 2 corresponds to the virtual function 0, and the processing cluster 3 corresponds to the virtual function 1. The virtual function 1 has the same processing capacity with the virtual function 2. This example is equivalent to example 3.

In example 8 shown in FIG. 6, the processing cluster 0 corresponds to the virtual function 0, the processing cluster 1 corresponds to the virtual function 1, the processing cluster 2 corresponds to the virtual function 0, and the processing cluster 3 corresponds to the virtual function 2. The virtual function 0 may have stronger processing capacity compared with the virtual function 1 and the virtual function 2, and the virtual function 1 and the virtual function 2 may have the same processing capacity. This example is equivalent to example 4.

This shows that flexible configuration of the virtual function may be realized through mapping different processing clusters to different virtual functions, so that the processing capability of the virtual function may be configured flexibly according to different demands. Therefore, compared with the prior art, the technical solutions of the present disclosure also have such advantages as simple configuration and flexibility.

According to another embodiment of the present disclosure, each virtual function has independent hardware resource.

The above mentioned hardware resource may be the processing core, or may be a memory (such as the DDR), a bus, an encoder/decoder, a video driver/audio driver, an interface unit, and the like. For example, the resource of PCIe board card includes artificial intelligence computation unit (IPU), video processing unit (VPU), graphics processing unit (JPU), and the memory. The present disclosure will not put any limitation on the type of hardware resources.

Figure 7:
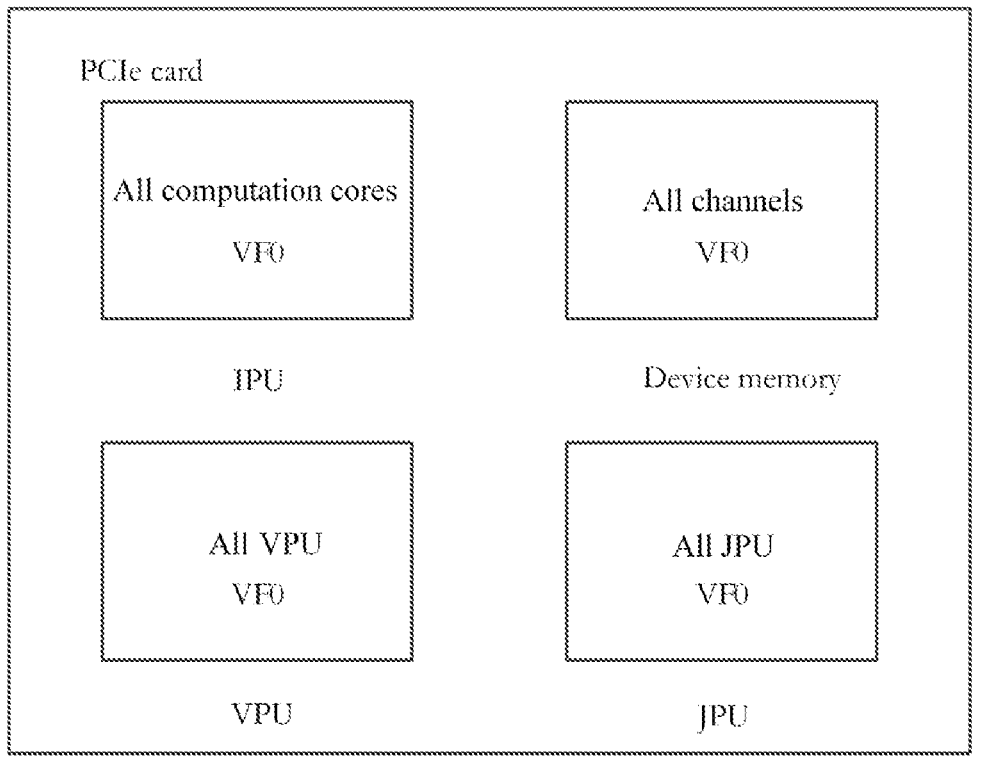
FIGS. 7, 8 and 9 exemplarily show resource consumption on the PCIe card of the multi-core processor when the multi-core processor is divided into one, two or four virtualization functions.
Figure 8:
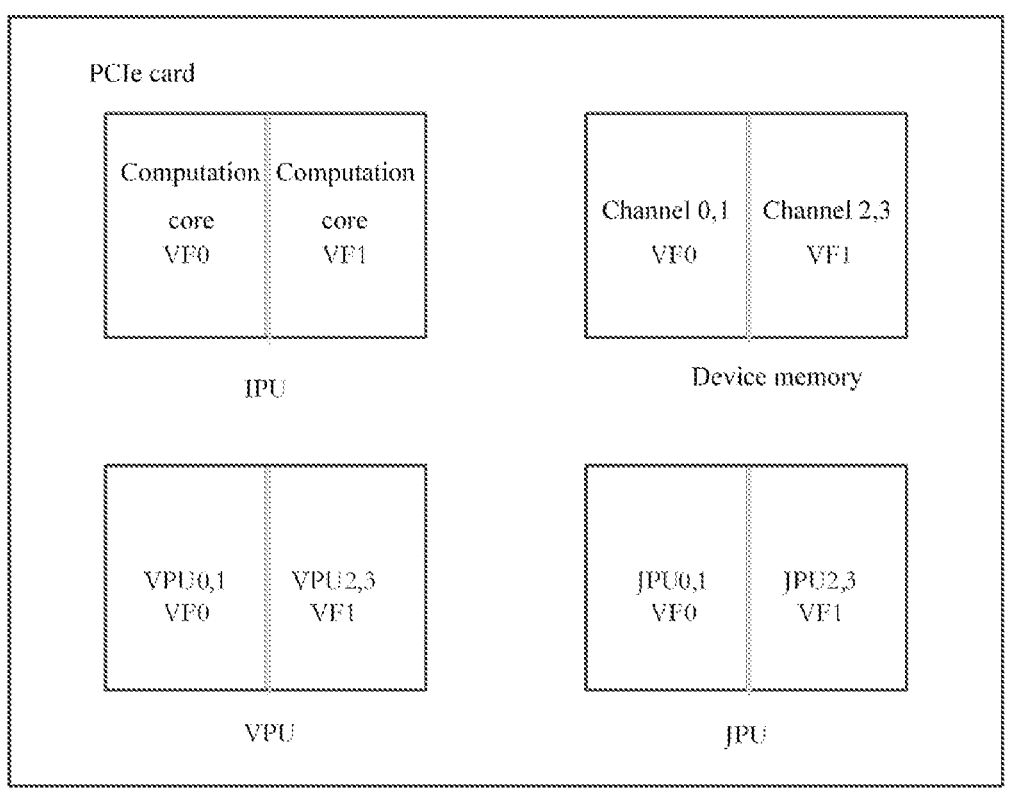
Figure 9:
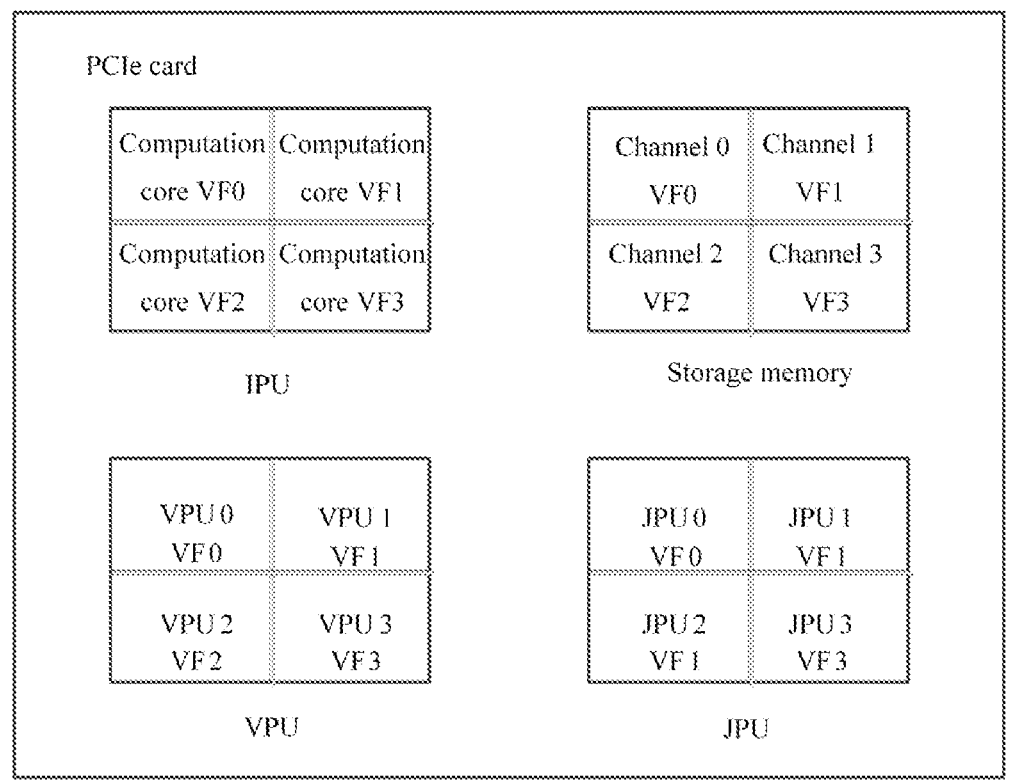

FIGS. 7, 8 and 9 exemplarily show resource consumption on the PCIe card of the multi-core processor when the multi-core processor is divided into one, two or four virtualization functions. It should be noted that the above mentioned multi-core processor may be such multiple types of multi-core computation apparatuses as JPU and VPU.

As shown in FIG. 7, when there is 1 virtual function, the virtual function VF0 may use all the resources; in other words, the virtual function may occupy all the computation cores, the channels, the VPU and the JPU.

As shown in FIG. 8, when there are two virtual functions, the virtual function VF0 and the virtual function VF2 may respectively occupy half of the resources; in other words, the VF0 may occupy half of the computation cores, and VF1 may occupy the other half of the computation cores. If there are four DDR channels, the VF0 may occupy channel 0 and channel 1, and VF1 may occupy channel 2 and channel 3. If there are four VPUs and JPUs, the VF0 may occupy VPU0 and VPU1, and the VF1 may occupy VPU2 and VPU3; VF0 may occupy JPU0 and JPU1, and VF1 may occupy JPU2 and JPU3.

As shown in FIG. 9, when there are four virtual functions, virtual function VF0 to VF3 may respectively occupy a quarter of the computation core. Likewise, if there are four DDR channels, four VPUs and four JPUs, virtual function VF0 to VF3 may respectively occupy channel 0 to channel 3; virtual function VF0 to VF3 may respectively occupy VPU0 to VPU3; virtual function VF0 to VF3 may respectively occupy JPU0 to JPU3.

Figure 10:
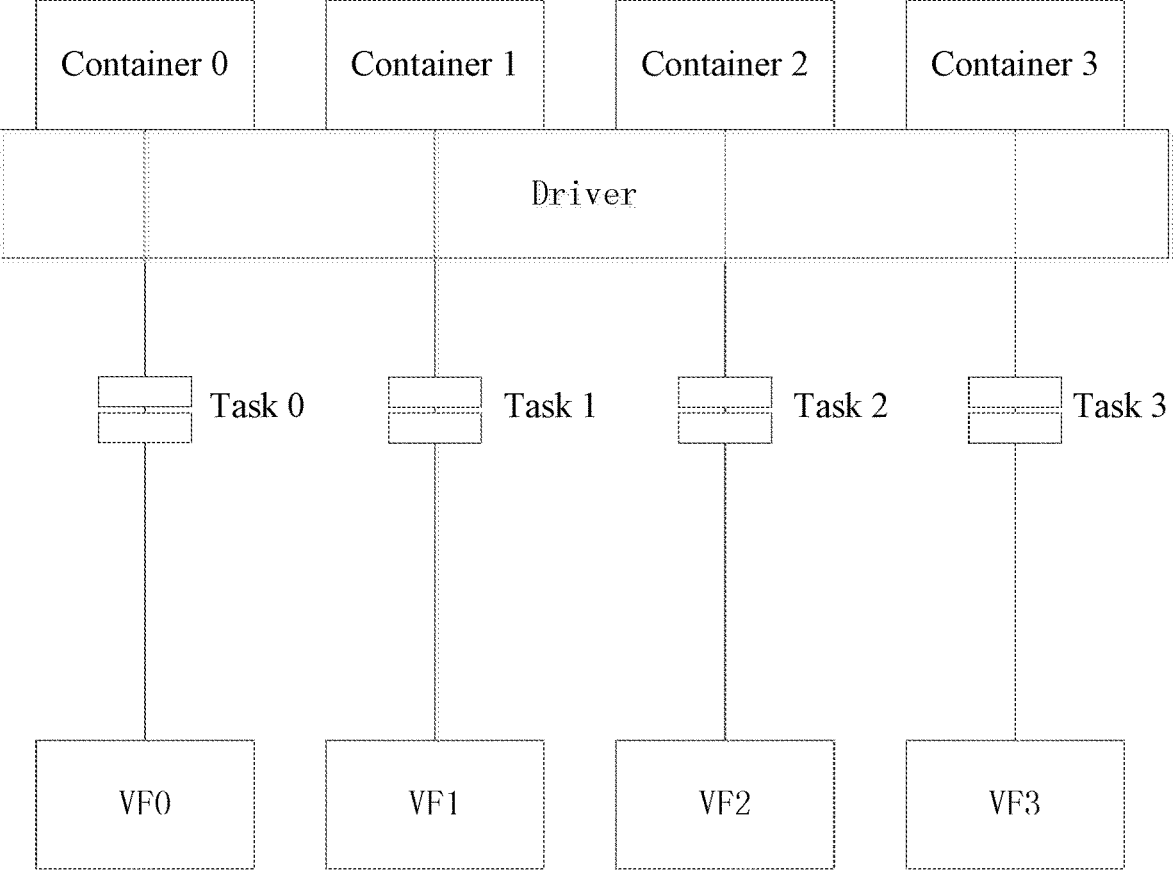
FIG. 10 is a schematic block diagram of a virtualization system, according to another embodiment of the present disclosure.

FIG. 10 is a schematic block diagram of a virtualization system according to another embodiment of the present disclosure.

As shown in FIG. 10, according to another embodiment of the present disclosure, the virtualization system of the present disclosure further includes a common driver, where the plurality of virtual functions are driven by the common driver.

The driver may be common to all the virtual functions, and it may be a program installed in an operating system. The driver, for example, may establish corresponding a node for each virtual function (VF). The node may be a document stored under a directory (such as a dev directory) to be operated or called by other applications. The name of the document may be different according to different manufactures.

After being created, one or a plurality of the nodes may correspond or be included to corresponding containers. Each container may include one or a plurality of nodes, which means that each container may correspond or include one or a plurality of virtual functions. In the present disclosure, each container may correspond or include different numbers of nodes, so that configuration of the container may be more flexible, and deployment of the container may be more convenient. Besides, different virtual functions may have different computation capabilities, so that the design may be flexible according to demands.

After the container is established, the methods of the present disclosure may further include establishing one to one mirror for each container, and the mirror may communicate with the container. The above mentioned mirror may be established through a docker-container technology.

The mirror may be remotely installed to a client side, and the user may operate or call the container through the mirror, so as to call the multi-core processor and any other types of related resources.

Figure 11:
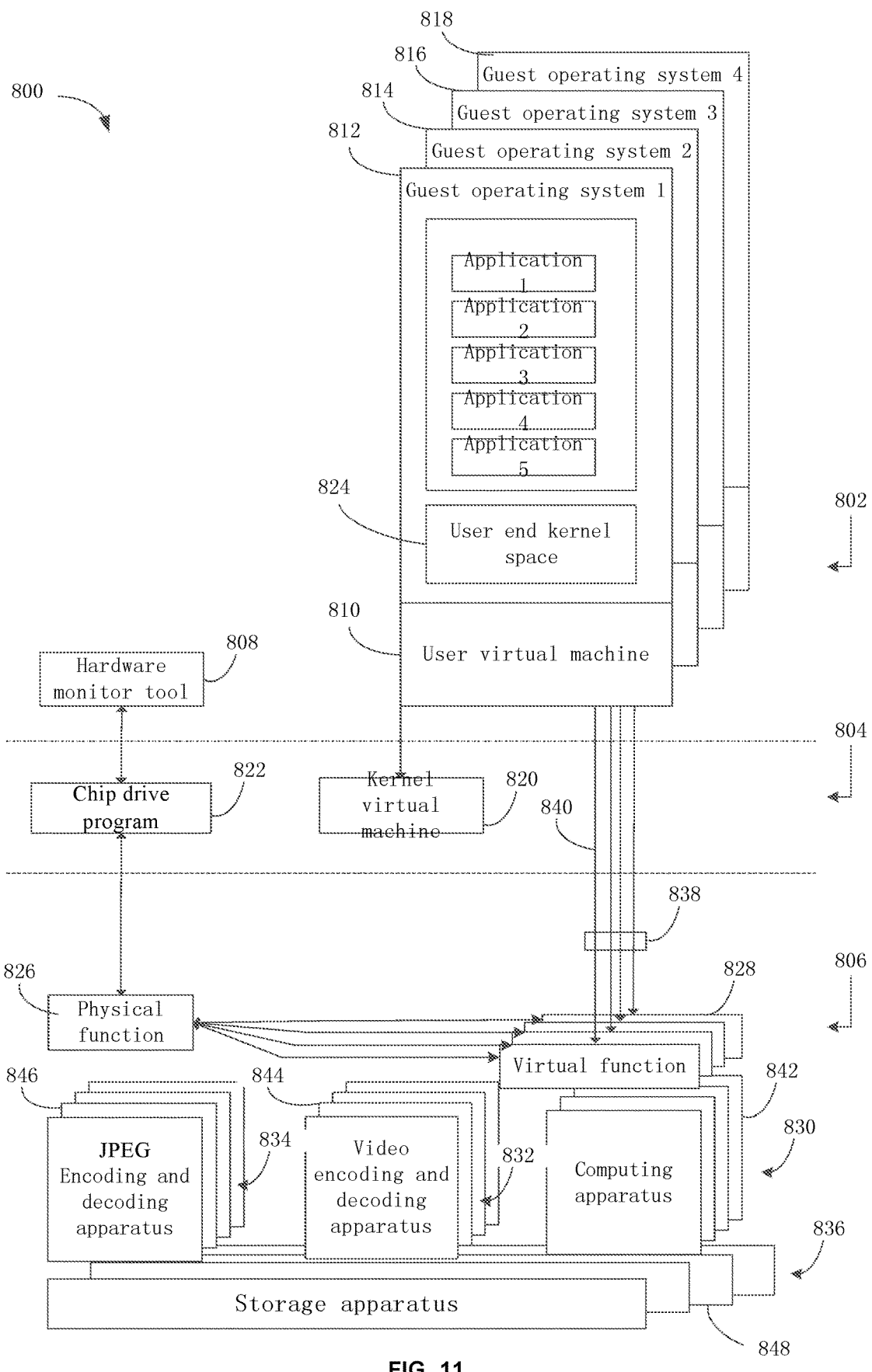
FIG. 11 is an exemplary structural diagram of a virtualization system.

FIG. 11 is an exemplary structural diagram of a virtualization system. The system in FIG. 11 adopts the virtual machine.

As shown in FIG. 11, a frame 800 includes a user space 802, a kernel space 804 and an on-chip system 806, and they are separated by dotted lines in FIG. 11. The user space 802 is an operation space for user program, and may only perform easy computation. The user space 802 may not directly call the system resource, but may only give instructions to the kernel through a system interface. The kernel space 804 is an operation space for kernel codes, and the kernel space 804 may perform any instructions and may call any resources of the system. The on-chip system 806 is unit of the artificial intelligence chip, and may collaborate with the user space 802 through the kernel space 804.

Unless particular emphasized, this embodiment is illustrated by the example of virtualizing one component to four virtualized components, but the present disclosure may not limit the number of the virtual component.

Before operating virtualization, the user space 802 is controlled by a hardware monitoring tool 808, and may obtain information of the on-chip system 806 through the call interface. The hardware monitoring tool 808 may not only collect information of the on-chip system 806, but may obtain resource overhead on on-chip system 806 by upper software in real time, providing real-time detailed information and state of the current on-chip system 806 to the users. These detailed information and state may be dozens of types of data such as a hardware device model, a firmware version number, a driver version number, a device utilization, a storage apparatus overhead state, a board card power consumption, a board card peak power consumption and a peripheral component interconnect express (PCIe). Because of different versions and usage scenarios of the hardware monitoring tool 808, content and number of the monitored information may be different.

After the system starts virtualization, operations of the user space 802 may be took over by a user virtual machine 810. The user virtual machine 810 is abstraction and simulation of the real computation environment. The system may allocate a set of data structure to manage a state of the user virtual machine 810. The set of data structure includes a complete set of register, service condition of the physical memory, and the state of the virtual device, and the like. The physical space of the user space 802 of the embodiment is virtualized to four virtual spaces 812, 814, 816 and 818. These four virtual spaces are independent and will not influence each other, and may respectively carry different guest operating systems, such as the guest operating system 1, a guest operating system 2, a guest operating system 3 and a guest operating system 4 shown in the figure. The guest operating system may be Windows, Linus, Unix, iOS, and Android, and different applications may operate on different guest operating systems.

In this embodiment, the user virtual machine 810 is implemented through a quick emulator (QEMU). QEMU is an open source virtualization software programmed in C language, and may virtualize the interface through a dynamic binary, and provide a series of hardware models to make the guest operating system 1, the guest operating system 2, the guest operating system 3 and the guest operating system 4 directly visit the on-chip system 806. The user space 802 may include a processor, a memory, an I/O device and the like. The QEMU may virtualize the processor of the user space 802 to four virtual processors, and virtualize the memory to four virtual memories, and may also virtualize the I/O device to four virtual I/O devices. Each guest operating system may take part of the resources of the user space 802. For example, taking a quarter of the resources of the user space means that each guest operating system may respectively access a virtual processor, a virtual memory, and a virtual I/O device to perform a task of the guest operating system. Through this mode, the guest operating system 1, the guest operating system 2, the guest operating system 3 and the guest operating system 4 may operate independently.

The kernel space 804 carries a kernel virtual machine 820 and a chip driver program 822. The kernel virtual machine 820 is matched with the QEMU, and the main responsibility of the kernel virtual machine 820 is to virtualize the kernel space 804 and the on-chip system 806 to make each guest operating system has its own address space when accessing the on-chip system 806. Particularly, space on the on-chip system 806 mapped to the guest operating system is a virtual component mapped to the process.

From the perspective of the user virtual machine 810, during the operation of the virtual machine, the QEMU calls the interface for kernel setup through the system provided by the kernel virtual machine 820. The QEMU uses the virtualization function of the kernel virtual machine 820, providing hardware virtualization acceleration for the virtual machine of the QEMU to improve the performance of the virtual machine. From the perspective of the kernel virtual machine 820, when the user may not directly interact with the kernel space 804, the manage tool of the user space 802 is required, so that the QEMU, a tool operating in the user space 802, may be required.

A chip driver program 822 is configured to drive a physical function 826. During the operation of the virtual machine, the user space 802 does not use a hardware monitor tool 808, but uses a chip drive program 822 to access an on-chip system 806. Therefore, the guest operating system 1, the guest operating system 2, the guest operating system 3 and the guest operating system 4 are respectively configured with the kernel space 824 to be loaded with the chip driver program 822, which enables each guest operating system drive the on-chip system 806.

The on-chip system 806 performs virtualization through the SR-IOV technology. In particular, the SR-IOV technology may be able to virtualize each component of the on-chip system 806. Therefore, each virtual component may has its corresponding unique accessible resource.

The on-chip system 806 of the embodiment includes hardware and firmware. The hardware includes an ROM (read only memory) that is not shown in the figure, and the ROM is configured to store the firmware. The firmware includes the physical function 826 to support or cooperate with the PCIe function of the SR-IOV, and the physical function 826 has the power to fully configure the PCIe resource. When implementing the SR-IOV technology, the physical function 826 may generate a plurality of virtual functions 828 through virtualization, and there are four virtual functions 828 in this embodiment. The virtual function 828 is a lightweight PCIe function that is managed by the physical function 826, and may share the PCIe physical resource with the physical function 826 and other virtual functions 828 related to the same physical function 826. The virtual function 828 is allowed to only control the resources configured to itself by the physical function 826

Once the SR-IOV is enabled in the physical function 826, each virtual function 828 may access its own PCIe configuration space through its bus, device and function number. Each virtual function 828 has one memory space configured to map a register set of the virtual function 828. The virtual function 828 drives the program to operate on the register set to enable the function of the register set, and the function may be directly designated to the corresponding user virtual machine 810. Even the virtual function 828 is virtual, the user virtual machine 810 may consider the virtual function 828 as a real PCIe device.

Hardware of the on-chip system 806 also includes a computation apparatus 830, a video encoding and decoding apparatus 832, a JPEG (joint photographic experts group) encoding and decoding apparatus 834, a storage apparatus 836, and a PCIe 838. In this embodiment, the computation apparatus 830 is an IPU (intelligence processing unit) configured to perform a convolution computation of the neural network. The video encoding and decoding apparatus 832 is configured to encode and decode video data. The JPEG encoding and decoding apparatus 834 is configured to encode and decode static pictures that adopts JPEG algorithm. The storage apparatus 836 may be a DRAM (dynamic random access memory) configured to store data. PCIe 838 is the above mentioned PCIe. During the operation of the virtual machine, the PCIe 838 may be virtualized to four virtual interfaces 840. The virtual function 828 has a one to one correspondence with the virtual interface 840; in other words, the first virtual function corresponds to the first virtual interface, the second virtual function corresponds to the second virtual interface, and the like.

Through the SR-IOV technology, the computation apparatus 830 may be virtualized to four virtual computation apparatuses 842, the video encoding and encoding apparatus 832 may be virtualized to four virtual video encoding and decoding apparatuses 844, the JPEG encoding and decoding apparatus 834 may be virtualized to four virtual JPEG encoding and decoding apparatuses 846, and the storage apparatus 836 may be virtualized to four virtual storage apparatuses 848.

Each guest operating system is configured with a set of virtual suite, and each set of the virtual suite includes a user virtual machine 810, a virtual interface 840, a virtual function 828, a virtual computation apparatus 842, a virtual video encoding and decoding apparatus 844, a virtual JPEG encoding and decoding apparatus 846 and a virtual storage apparatus 848. Each set of the virtual suite may operate independently without affecting each other, and the virtual suite is configured to perform the delivered tasks from the corresponding guest operating system, so as to make sure that each guest operating system may access the configured virtual computation apparatus 842, the virtual video encoding and decoding apparatus 844, the virtual JPEG encoding and decoding apparatus 846 and the virtual storage apparatus 848 through the configured virtual interface 840 and the virtual function 828.

Specifically, when performing tasks, each guest operating system may access different hardware in response to different tasks. For example, if one task is to perform computation, such as a matrix convolutional computation, the guest operating system may access the configured virtual computation apparatus 842 through the configured virtual interface 840 and the virtual function 828; if one task is to perform video encoding and decoding, the guest operating system may access the configured virtual video encoding and decoding apparatus 844 through the configured virtual interface 840 and the virtual function 828; if one task is to perform JPEG encoding and decoding, the guest operating system may access the configured virtual JPEG encoding and decoding apparatus 846 through the configured virtual interface 840 and the virtual function 828; and if one task is to read or write data, the guest operating system may access the configured virtual storage apparatus 848 through the configured virtual interface 840 and the virtual function 828.

Figure 14:
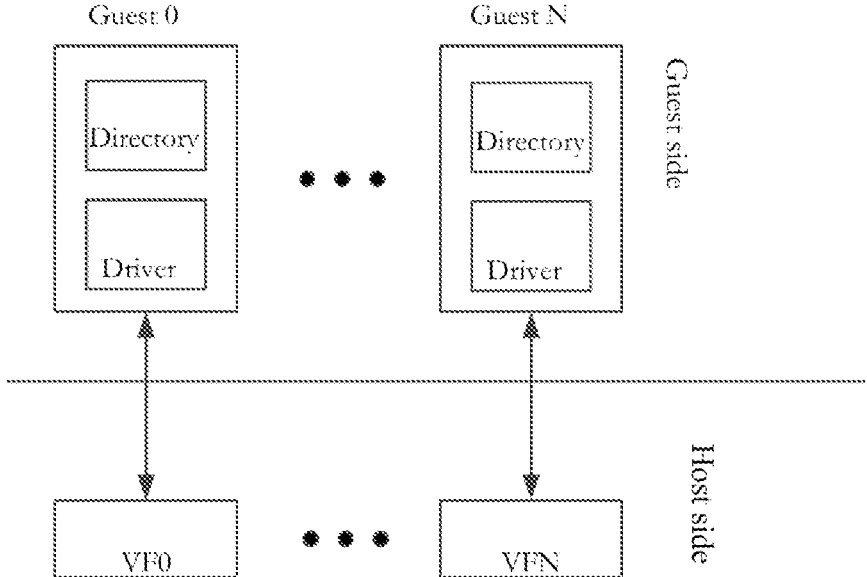
FIGS. 14 and 15 are comparison schematic diagrams between a virtual machine mode and a Docker mode.
Figure 15:
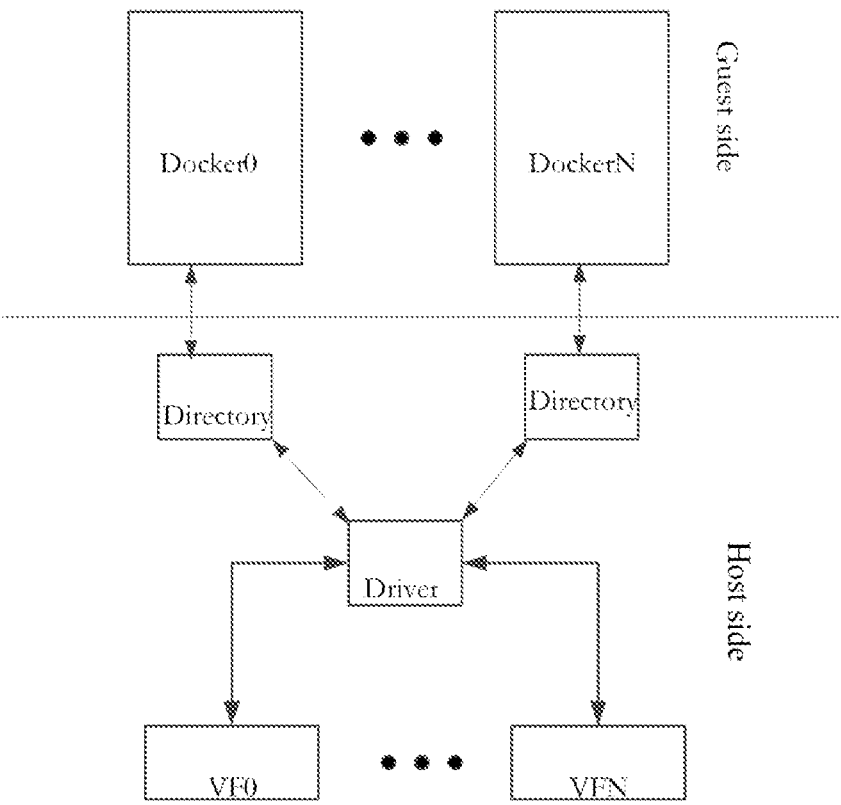

FIGS. 14 and 15 show a comparison schematic diagram between a virtual machine mode and a Docker mode.

In FIG. 14, under the virtual machine mode, a Host may pass PCIe device to a Guest, and the Guest includes a driver and a directory. Therefore, each Guest may need to load the driver itself, and create nodes, which are character devices, under the directory of the Guest.

In FIG. 15, under the Docker mode, the driver and the directory are all in the Host, so that only the Host is required to load the driver, and the driver is public to all the virtual functions. Therefore, the driver of the host may create nodes, which are character devices, under the directory of the Host, and may pass the device to a mirror device; in other words, the device may be passed into the Docker. Therefore, compared with the virtual machine mode, the docker-container mode of the present disclosure does not require each Guest to install and load the driver, thereby simplifying setting of the system and making the use of the user more convenient.

Similar to the usage scenario of the hardware virtual machine, a lightweight Docker-based virtualization solution is not only at the granularity of a whole card, but requires a plurality of containers at a fine granularity to share one or a plurality of physical accelerator cards. One or a plurality of VFs may be used in each Docker container. VFs in different containers may isolate from each other and work independently and safely.

The hardware virtualization solution using the SR-IOV may support the usage mode of the Docker at the same time, and may generate a plurality of VFs on the physical machine at the same time. The system administrator may designate different VFs to different containers according to demands. VFs belong to different containers may work independently without interfering each other. VF-to-VF has the same robustness and secure isolation as PF-to-PF. Compared with the virtual machine mode, the advantage of the Docker lies in quicker startup and less needed resources, and the Docker has a high utilization ratio of the system, which makes development, test, and deployment easier.

The present disclosure also provides a multi-core processor that includes a plurality of processing cores, where the multi-core processor is divided into a plurality of virtual functions, and each virtual function corresponds to one or a plurality of processing cores.

The present disclosure also provides an electronic device, which includes the above mentioned virtualization system or the above mentioned multi-core processor. The electronic device may be a Host; in other words, the technical solution of the present disclosure may be realized in the Host, and may communicate with an external mirror (docker).

According to different application scenarios, the electronic device or apparatus may further include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

The present disclosure also provides a computer-readable storage medium, on which computer program code is stored. The above mentioned method may be implemented when the computer program code is run by the processor.

The present disclosure may realize at least one of the following technical effects:

1. Adopting hardware isolation, which may greatly improve security. Even though a problem occurs in one virtual function or container, normal operation of other parts may not be affected.

2. The QEMU does not need to be modified, thereby reducing the complexity of setting up the system.

3. Each part is relatively independent, so that there may be short latency and high QoS (Quality of Service).

4. No HOL blocking.

5. No adjacent noise.

6. No context switch overhead. Different from a virtualization technology adopted by a traditional vGPU, the present disclosure adopts a sharing method that does not based on time slicing, eliminating performance overhead brought by context switch.

7. Easy to be extended and deployed.

Figure 12:
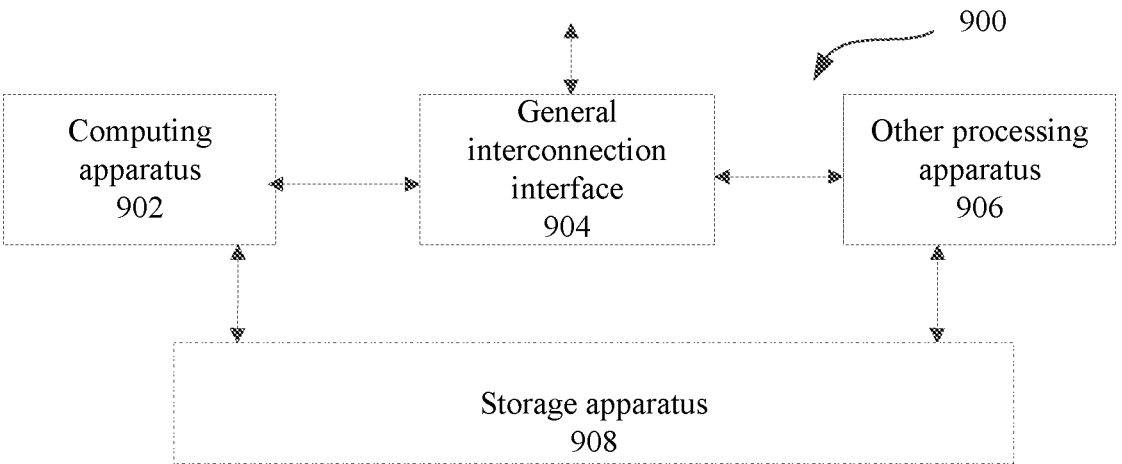
FIG. 12 is a schematic diagram of a combined processing apparatus of the present disclosure.

FIG. 12 shows a combined processing apparatus 900, which includes the above-mentioned computation apparatus 902 (such as the computation apparatus 830 and the like shown in FIG. 11), a general interconnection interface 904, and other processing apparatus 906. According to computation apparatus of the present disclosure, the combined processing apparatus 900 interacts with other processing apparatuses to jointly complete operations specified by the user. FIG. 12 is a schematic diagram of the combined processing apparatus.

Other processing apparatuses include one or more types of general-purpose/special-purpose processors such as a central processing unit (CPU), a graphics processing unit (GPU), a neural network processor, and the like. A count of processors included in other processing apparatuses is not limited. Other processing apparatuses may serve as an interface that connects a machine learning computation apparatus to external data and control including data moving, and may perform basic controls such as starting and stopping the machine learning computation apparatus; other processing apparatuses may also cooperate with the machine learning computation apparatus to complete computation tasks.

The general interconnection interface is configured to transfer data and a control instruction between the computation apparatus (such as the machine learning computation apparatus) and other processing apparatuses. The computation apparatus is configured to obtain required input data from other processing apparatuses and write the data in an on-chip storage apparatus of the computation apparatus. The computation apparatus may obtain a control instruction from other processing apparatuses, and write the control instruction in an on-chip control cache of the computation apparatus. The computation apparatus may further read data stored in a storage unit of the computation apparatus and transfer the data to other processing apparatuses.

Alternatively, the structure may also include a storage apparatus 908. The storage apparatus 908 is connected to the computation apparatus and other processing apparatuses respectively. The storage apparatus is configured to store data of the computation apparatus and other processing apparatuses, and is especially suitable for storing data that cannot be fully stored in the internal memory of the computation apparatus or other processing apparatuses.

The combined processing apparatus may be used as an SOC (system on chip) of a device including a mobile phone, a robot, a drone, a video surveillance device, and the like, thereby effectively reducing the core area of a control section, increasing the processing speed, and reducing the overall power consumption. In this case, the general interconnection interface of the combined processing apparatus may be connected to some components of the apparatus. These components include, for example, a webcam, a monitor, a mouse, a keyboard, a network card, and a WIFI interface.

In some embodiments, the present disclosure provides a chip including the above mentioned computation apparatus or the combined processing apparatus.

Figure 13:
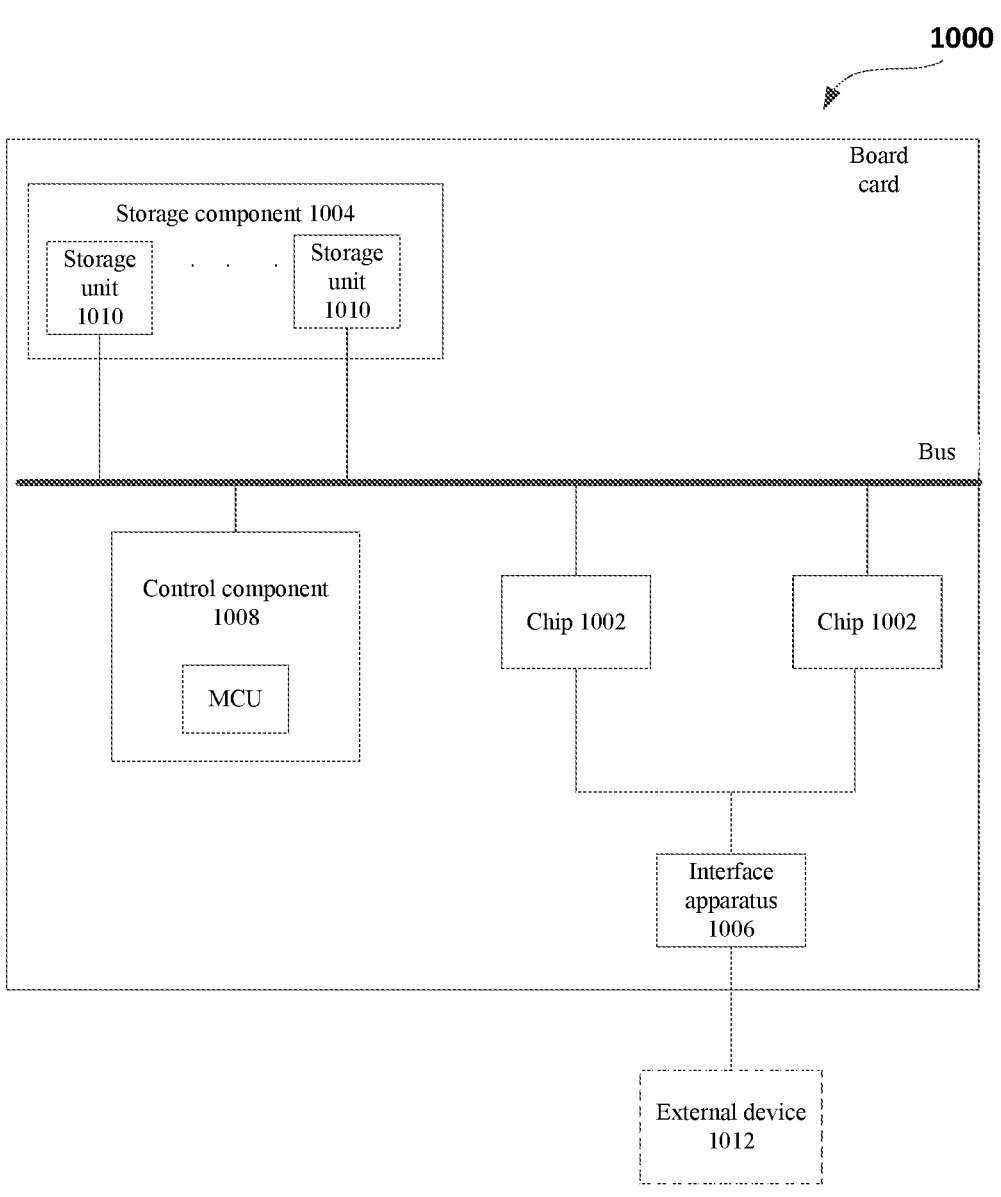
FIG. 13 is an exemplary block diagram of a board card of the present disclosure.

In some embodiments, the present disclosure also provides a board card, which includes the above mentioned chip. FIG. 13 provides an exemplary board card, which not only includes the above mentioned chip 1002, but also includes other supporting components. Other supporting components include but are not limited to a storage component 1004, an interface apparatus 1006, and a control component 1008.

The storage component is connected to the chip in the chip package structure through a bus, and the storage component is configured to store data. The storage component may include a plurality of groups of storage units 1010. Each group of the storage units is connected to the chip through a bus. It may be understood that each group of the storage unit may be a DDR SDRAM (double data rate synchronous dynamic random-access memory).

The DDR may double the speed of the SDRAM without increasing the clock frequency. The DDR allows data to be read on the rising and falling edges of the clock pulse. The speed of the DDR is twice the speed of a standard SDRAM. In an embodiment, the storage apparatus may include 4 groups of storage units. Each group of the storage unit may include a plurality of DDR4 particles (chips). In an embodiment, four 72-bit DDR4 controllers may be included in the chip, where 64 bits of each 72-bit DDR4 controller are for data transfer and 8 bits are for ECC (error checking and correcting) parity. In an embodiment, each group of the storage units includes a plurality of DDR SDRAMs arranged in parallel. DDR may transfer data twice in one clock cycle. A controller for controlling the DDR is arranged in the chip to control data transfer and data storage of each storage unit.

The interface apparatus may be electrically connected to the chip inside the chip package structure. The interface apparatus is configured to implement data transfer between the chip and an external device 1012 (such as a server or a computer). For example, in an embodiment, the interface apparatus may be a standard PCIe (peripheral component interconnect express) interface. For instance, data to be processed may be transferred by a server through the standard PCIe interface to the chip, thereby realizing data transfer. In another embodiment, the interface apparatus may also be other interfaces. The present disclosure does not limit a specific form of expression of other interfaces as long as the interface unit may realize a transferring function. In addition, a computation result of the chip is still sent back to the external device (such as a server) by the interface apparatus.

The control component is electronically connected to the chip. The control component is configured to monitor a state of the chip. Specifically, the chip and the control component may be electrically connected through an SPI (serial peripheral interface) interface. The control component may include an MCU (Micro controller unit). For example, the chip may include a plurality of processing chips, a plurality of processing cores, or a plurality of processing circuits, and may drive a plurality of loads. Therefore, the chip may be in different working states such as a multi-load working state and a light-load working state. The control apparatus may realize regulation of working states of a plurality of processing chips, a plurality of processing cores and/or a plurality of processing circuits in the chip.

It should be noted that the above mentioned embodiments, for the sake of conciseness, are all described as a series of action combinations, but those skilled in the art should know that the present disclosure is not limited by the described order of action since some steps may be performed in a different order or simultaneously according to the present disclosure. Secondly, those skilled in the art should also understand that the embodiments described in the specification are all optional, and the actions and units involved are not necessarily required for the present disclosure.

In the above-mentioned embodiments, descriptions of each embodiment have their own emphasis. For parts that are not described in detail in an embodiment, reference may be made to related descriptions of other embodiments.

In some embodiments of the present disclosure, it should be understood that the disclosed apparatus may be implemented through other manners. The apparatus embodiments described above are merely illustrative, for example, the division of the unit is only a division of a logical function. In a real implementation, there may be other manners for division. For example, a plurality of units or components may be combined or may be integrated into another system, or some features may be ignored or not be performed. In addition, coupling or direct coupling or communication connection between each illustrated or discussed component may be indirect coupling or communication connection through some interfaces, apparatuses or units, and may in the form of electrical, optical, acoustic, magnetic, and the like.

The units described as separate components may or may not be physically separated. The components shown as units may or may not be physical units. In other words, the components may be located in one place, or may be distributed into a plurality of network units. According to certain needs, some or all of the units may be selected for implementing the purposes of the schemes of the embodiments.

In addition, functional units in every embodiment of the present disclosure may be integrated into one processing unit, or each unit may be physically stand alone, or two or more units may be integrated into one unit. The integrated units above may be implemented in the form of hardware or in the form of software program unit.

When the integrated units are implemented in the form of a software program unit and sold or used as an independent product, the integrated units may be stored in a computer-readable memory. Based on such understanding, the technical solutions of the present disclosure may be embodied in the form of a software product that is stored in a memory. The computer software product includes several instructions to enable a computer device (which may be a personal computer, a server, or a network device, and the like) to perform all or part of the steps of the methods described in each embodiment of the present disclosure. The foregoing memory includes: a USB flash drive, a read-only memory (ROM), a random-access memory (RAM), a mobile hard disk, a magnetic disk, or an optical disc, and other media that may store program codes.

The embodiments of the present disclosure are described in detail before. Specific examples are used in the specification to explain the principles and implementation manners of the present disclosure. The descriptions of the above embodiments are only used to facilitate understanding of the methods and core ideas of the present disclosure. In addition, persons of ordinary skill in the art may change the implementation and application scope according to the ideas of the present disclosure. In summary, the content of this specification should not be understood as a limitation on the present disclosure.

The technical solutions of the present disclosure may be better understood through the following articles.

Article A1. A virtualization method based on a multi-core processor, wherein the multi-core processor includes a plurality of processing cores, and the method comprises:

dividing the multi-core processor into a plurality of virtual functions, wherein each virtual function corresponds to one or a plurality of processing cores; and mapping the virtual function to a container.

Article A2. The method of article A1, wherein there are a plurality of containers, and the plurality of containers operate independently.

Article A3. The method of article A1 or article A2, wherein a certain amount of processing cores constitute a processing cluster, and each virtual function corresponds to one or a plurality of processing clusters.

Article A4. The method of any one of article A1 to article A3, wherein one virtual function corresponds to one container, or a plurality of virtual functions correspond to one container.

Article A5. The method of any one of article A1 to article A4, wherein each virtual function has independent hardware.

Article A6. The method of any one of article A1 to article A5, wherein the plurality of virtual functions are driven by a common driver.

Article A7. The method of article A6, wherein a node corresponding to each virtual function is established through the driver, and the container corresponds to one or a plurality of nodes.

Article A8. The method of any one of article A1 to article A7 further comprising: establishing a one to one mirror for each container, and the mirror communicates with the container.

Article A9. A virtualization system, comprising:

a multi-core processor, wherein the multi-core processor includes a plurality of processing cores;

a plurality of virtual functions, wherein each virtual function corresponds to one or a plurality of processing cores; and a container that corresponds to the virtual function.

Article A10. The virtualization system of article A9, wherein there are a plurality of containers, and the plurality of containers operate independently.

Article A11. The virtualization system of article A9 or article A10, wherein a certain amount of processing cores constitute a processing cluster, and each virtual function corresponds to one or a plurality of processing clusters.

Article A12. The virtualization system of any one of article A9 to article A11, wherein one virtual function corresponds to one container, or a plurality of virtual functions correspond to one container.

Article A13. The virtualization system of any one of article A9 to article A12, wherein each virtual function has independent hardware.

Article A14. The virtualization system of any one of article A9 to article A13 further comprising: a common driver, wherein the plurality of virtual functions are driven by the common driver.

Article A15. The virtualization system of article A14, wherein the common driver is configured to establish a node corresponding to each virtual function, and the container corresponds to one or a plurality of nodes.

Article A16. The virtualization system of any one of article A9 to article A15 further comprising: a mirror, wherein the mirror corresponds to the container one to one, and the mirror communicates with the container.

Article A17. A multi-core processor comprising a plurality of processing cores, wherein the multi-core processor is divided into a plurality of virtual functions, wherein each virtual function corresponds to one or a plurality of processing cores.

Article A18. An electronic device that comprising the virtualization system of any one of article A9 to article A16 or the multi-core processor of article A17.

Article A19. A computer-readable storage medium, on which computer program code is stored, wherein the method of any one of the article A1 to article A8 is implemented when the computer program code is operated by the processor. 202010131483.4

202010358635.4 The present disclosure relates to the field of artificial intelligence, in particular to a virtualization technology of a processor.

Figure 16:
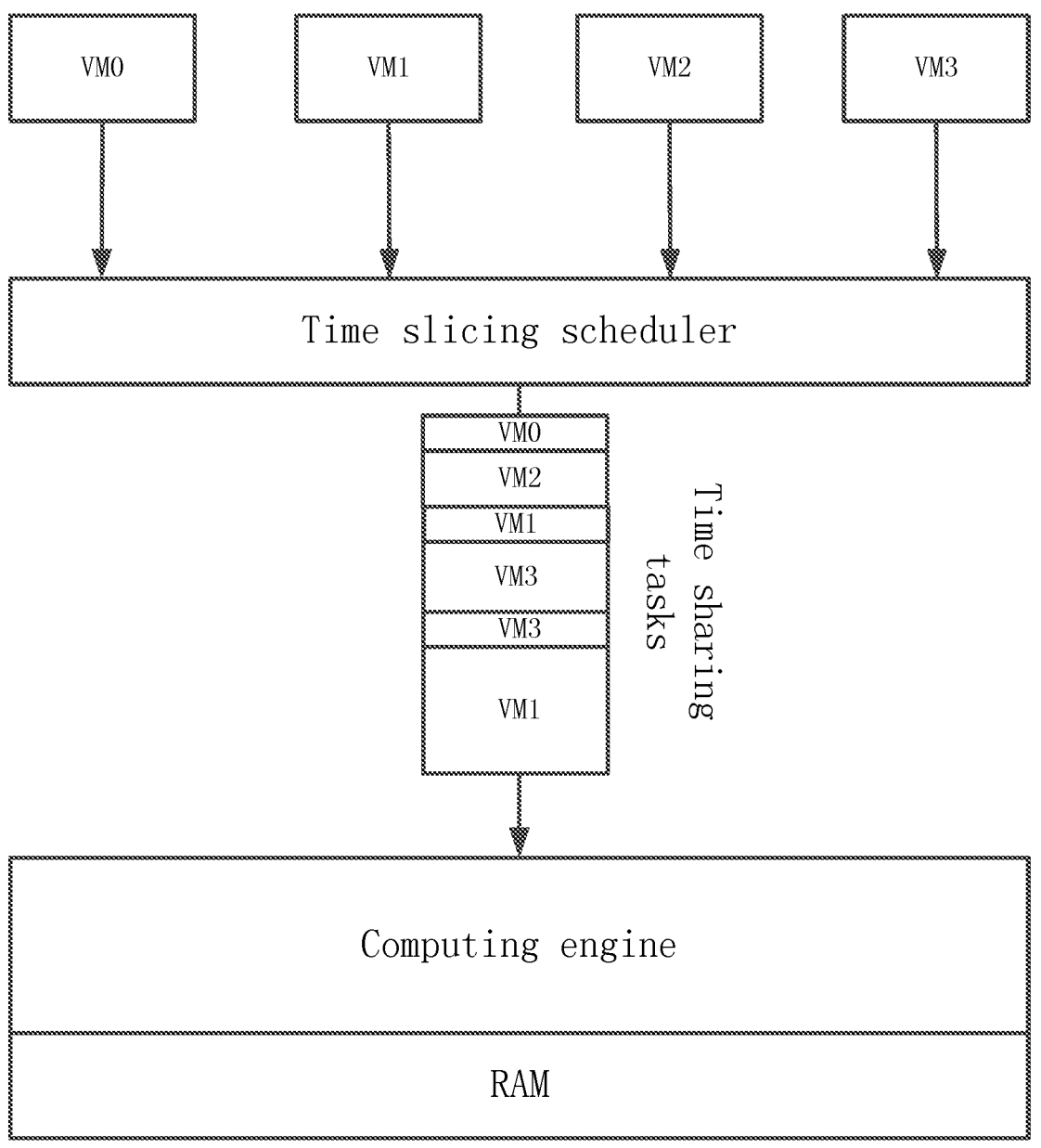
FIG. 16 is a schematic block diagram of realizing virtualization through a time slicing technology.

In computer field, virtualization is a resource management technology that abstracts, converts and then presents every kinds of computer resources such as server, network, memory and storage. Virtualization enables the user to apply such resources in a better manner than an original configuration. FIG. 16 is a schematic block diagram of realizing virtualization through a time slicing technology.

As shown in FIG. 16, there are four virtual machines VM0 to VM3, which may perform their own tasks respectively. These tasks may form time slicing and be sorted according to time after passing through a time slicing manager. A computing engine may process different tasks (time-sharing tasks) according to the time slicing. Under this mode, when the virtual machine VM1 works, other virtual machines may not work but in a waiting time. When the time slicing is small, it may not be easy for the user to notice time latency. However, if a task of a virtual machine takes a large amount of time (such as the VM1 shown in FIG. 16), other users may notice obvious time latency, which may affect user experience.

Besides, in the prior art, the computation engine is public to different virtual machines, and once a virtual machine causes problems to the computation engine, all the virtual machines may be affected, thereby affecting all the users.

Therefore, existing virtual machine solutions have such defects as low computation efficiency, HOL blocking, high adjacent noise, and difficulty in extending.

Technical solutions in embodiments of the present disclosure may be described clearly and completely hereinafter with reference to the accompanied drawings in the embodiments of the present disclosure. Obviously, the embodiments to be described are merely some rather than all embodiments of the present disclosure. All other embodiments obtained by those skilled in the art based on the embodiments of the present disclosure without creative efforts shall fall within the protection scope of the present disclosure.

It should be understood that terms such as "the first", "the second", "the third", and "the fourth" appear in the claims, the specification, and the drawings are used for distinguishing different objects rather than describing a specific order. It should be understood that the terms "including" and "comprising" used in the specification and the claim indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claim of the present disclosure, unless the context clearly indicates otherwise, the singular forms "a", "an", and "the" are intended to include the plural forms. It should also be understood that the term "and/or" used in the specification and the claim refers to any and all possible combinations of one or more of relevant listed items and includes these combinations.

As being used in this specification and the claim, the term "if" may be interpreted as "when", or "once" or "in response to a determination" or "in response to a case where something is detected" depending on the context. Similarly, depending on the context, the clause "if it is determined that" or "if [a described condition or event] is detected" may be interpreted as "once it is determined that", or "in response to a determination", or "once [a described condition or event] is detected", or "in response to a case where [a described condition or event] is detected".

Further, in the specification and the claim of the present disclosure, the correspondence between two parts may be understood as a connection relation, a response relation or a matching relation between two parts.

Virtualization is a technology that may virtualize a computer device to a plurality of virtual machines. When the plurality of virtual machines are run on one computer at the same time, each virtual machine may run the same or different operating systems. Applications running on the operating systems may run in separate space without affecting each other, thus significantly improving working efficiency of the computer.

The virtualization technology is different form the multi-task or the hyper-threading technology. The multi-task refers to running a plurality of programs in one operating system at the same time. However, in the virtualization technology, the plurality of operating systems may be run at the same time, and each operating system contains a plurality of running programs, and each operating system is run on a virtual machine. The hyper-threading technology means that a uniprocessor simulates two processors to balance the operating performance of a program. These two simulated processors may not be separated, but may only work together. However, in the virtualization technology, a virtual processor may work independently.

The virtualization technology usually uses software to redefine and divide physical resources of the computer, so as to realize dynamic allocation, flexible schedule and cross-domain sharing of the computer resources, thereby improving resource utilization.

Figure 17:
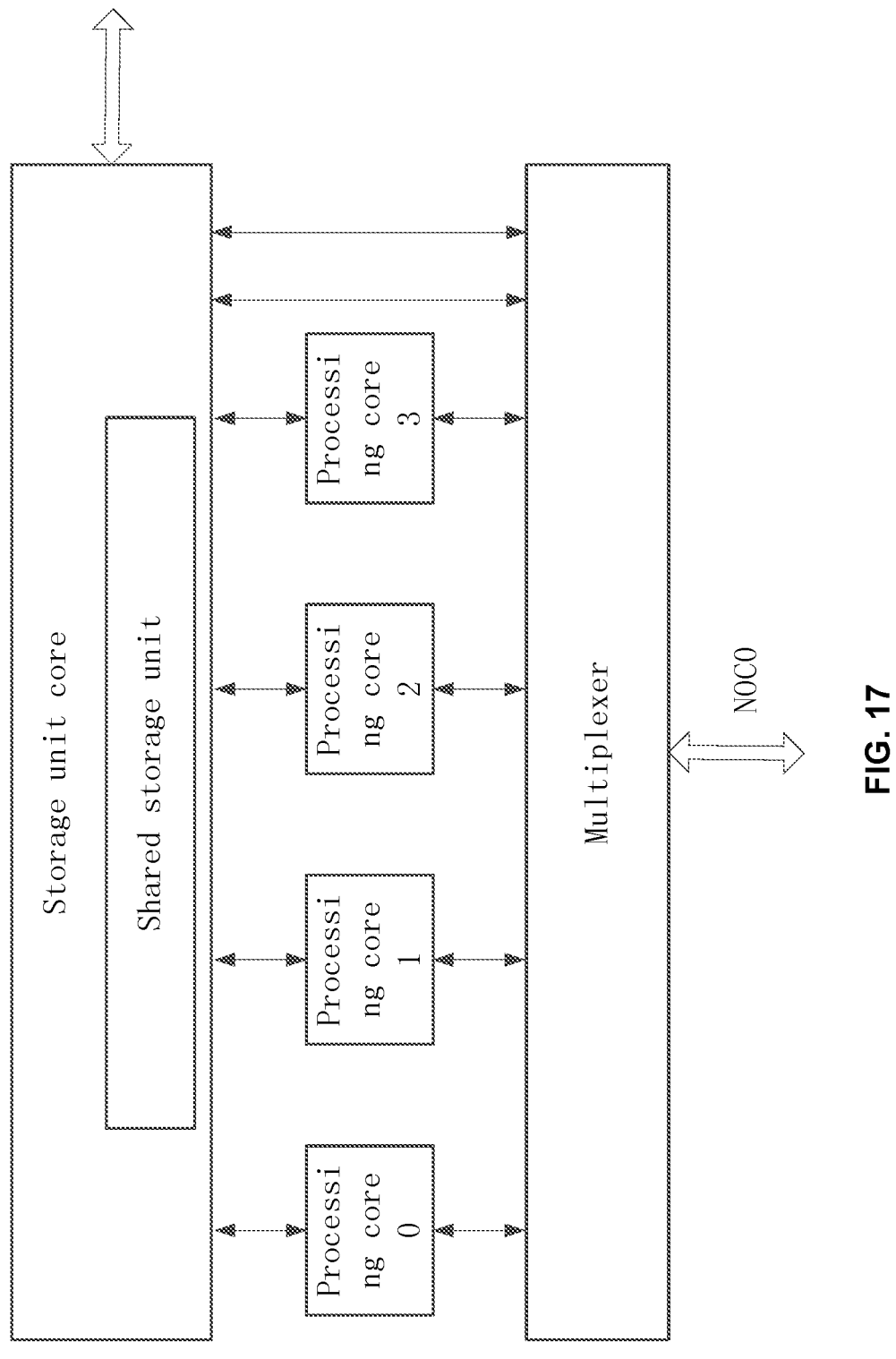
FIG. 17 is a schematic diagram of an internal structure of a processing cluster that may be applied to the methods of the present disclosure.

FIG. 17 is a schematic diagram of an internal structure of a processing cluster to which the methods of the present disclosure may be applied.

The artificial intelligence chip accelerates computation capability of data, thereby decreasing memory accessing latency. The artificial intelligence chip adopts a multi-core processor architecture, and adds storage unit core (which may also be called as an on-chip storage unit) to accelerate data reading, solving the bottleneck problem of memory accessing of the processing cores of the artificial intelligence chip and the DDR (which may also be called as an off-chip storage unit), and providing high computation capability in scenarios such as deep learning and network computation.

The artificial intelligence chip, for example, may have 16 processing cores configured to perform computational tasks. Every four processing cores may constitute one processing cluster, so that there are four processing clusters. Every processing cluster has a plurality of inner storage unit cores. The storage unit core is mainly configured to exchange data between a shared storage unit in the processing cluster and the processing cores, and exchange data among processing clusters. When a storage unit core and the processing core access the DDR at the same time, arbitration by the multi-plexer may assure that only one group of bus may access the DDR.

Figure 18:
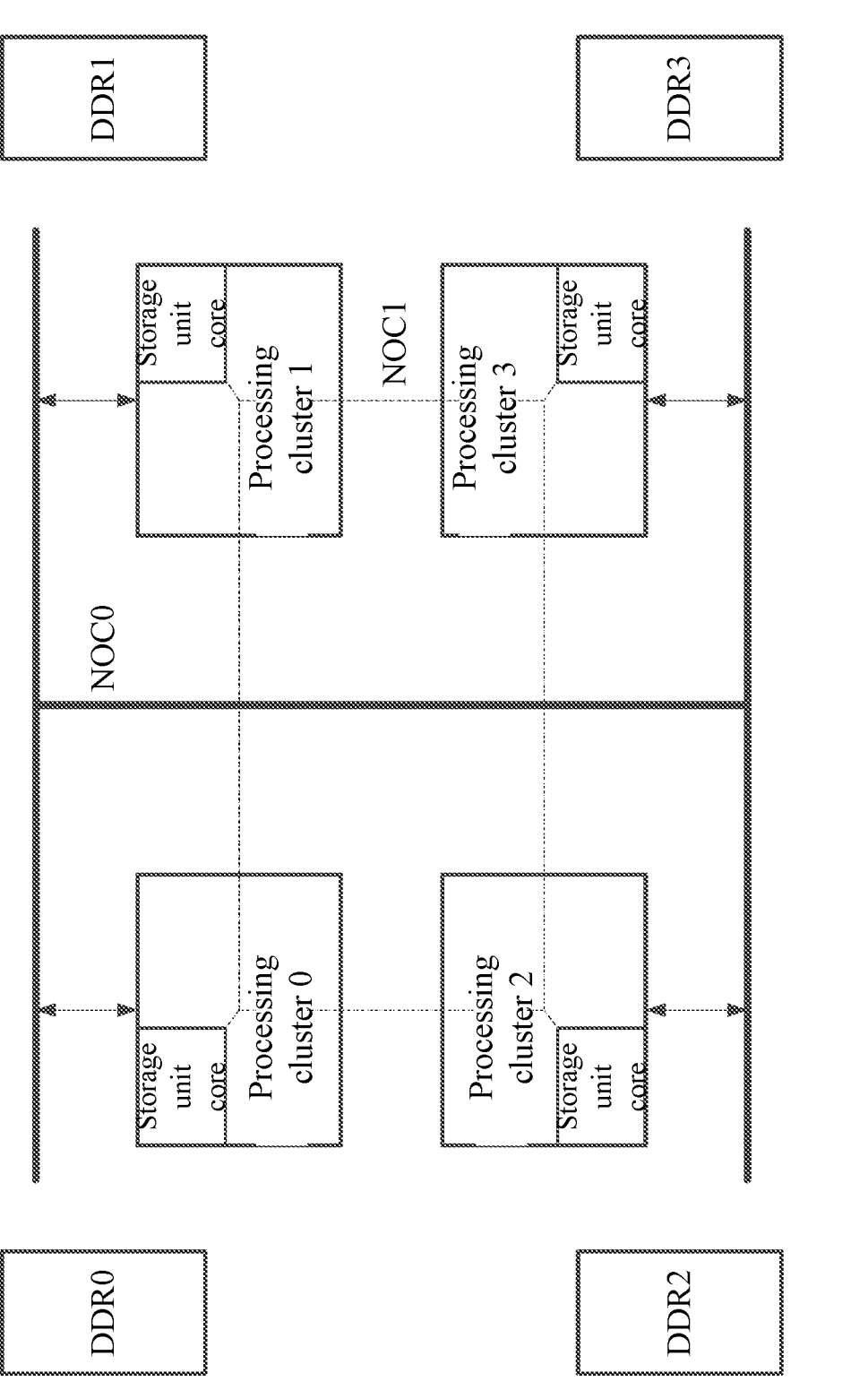
FIG. 18 is a structural diagram of an artificial intelligence processor to which the method of the present disclosure may be applied.

FIG. 18 is a structural diagram of an artificial intelligence processor to which the method of the present disclosure may be applied.

The DDR of the artificial intelligence chip adopts a non-uniform memory access (NUMA) architecture, and each processing cluster may access different DDR channels through NOC0 (network-on-chip), but the latency to access different DDR channels is different. Each processing cluster corresponds to a DDR channel with the lowest access latency, and the latency is relatively long when the processing cluster accessing other channels. As shown in the structural diagram of the processing cluster and the DDR in FIG. 2-1*b*, a processing cluster 0, a processing cluster 1, a processing cluster 2 and a processing cluster 3 may have the lowest latency when they respectively access corresponding DDR0, DDR1, DDR2 and DDR3. In other words, each processing core accesses the DDR channel with the lowest memory access latency for its respective processing cluster.

A memory access bandwidth in the processing cluster is relatively wider than the access bandwidth between the processing core and the DDR, so that the artificial intelligence chip may adopt the processing cluster to realize inner access of the shared storage unit, reducing direct access of the processing core to the DDR, thereby improving data throughput.

When four cores are required to perform computation in parallel, the storage unit cores may broadcast data from the shared storage unit to the four processing cores within the processing cluster simultaneously for data computation by adopting data broadcasting method (via NOC1). Compared with the method that all the processing cores read data through the DDR, the above mentioned method may decrease the memory access latency and optimize computational performance.

If the virtualization is implemented through traditional method, all the virtual machines may share all the four processing clusters. When there are few tasks, some processing clusters may in vacancy, causing a waste of resources.

The environment in which the technical solutions of the present disclosure is applied is described above, and the following may describe a plurality of implementations of the present disclosure in detail. Combined with FIG. 19 and FIG. 20, the following may describe specific implementations of the present disclosure.

Figure 19:
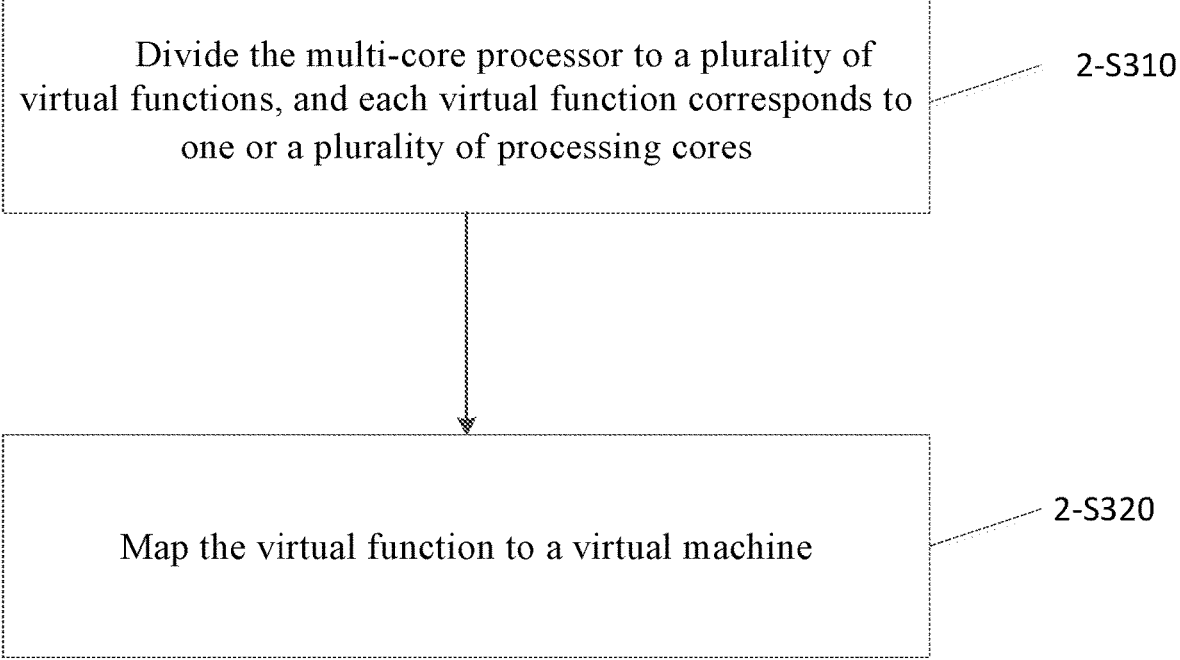
FIG. 19 is a virtualization method based on a multi-core processor, according to a first aspect of the present disclosure.

FIG. 19 shows a virtualization method based on the multi-core processor, such as an artificial intelligence processor, according to the first aspect of the present disclosure. The multi-core processor includes a plurality of processing cores. The method includes: dividing the multi-core processor to a plurality of virtualization functions in operation 2-S310, where each virtualization function corresponds to one or a plurality of processing cores; and in operation 2-S320, corresponding the virtualization function to the virtual machine.

Figure 20:
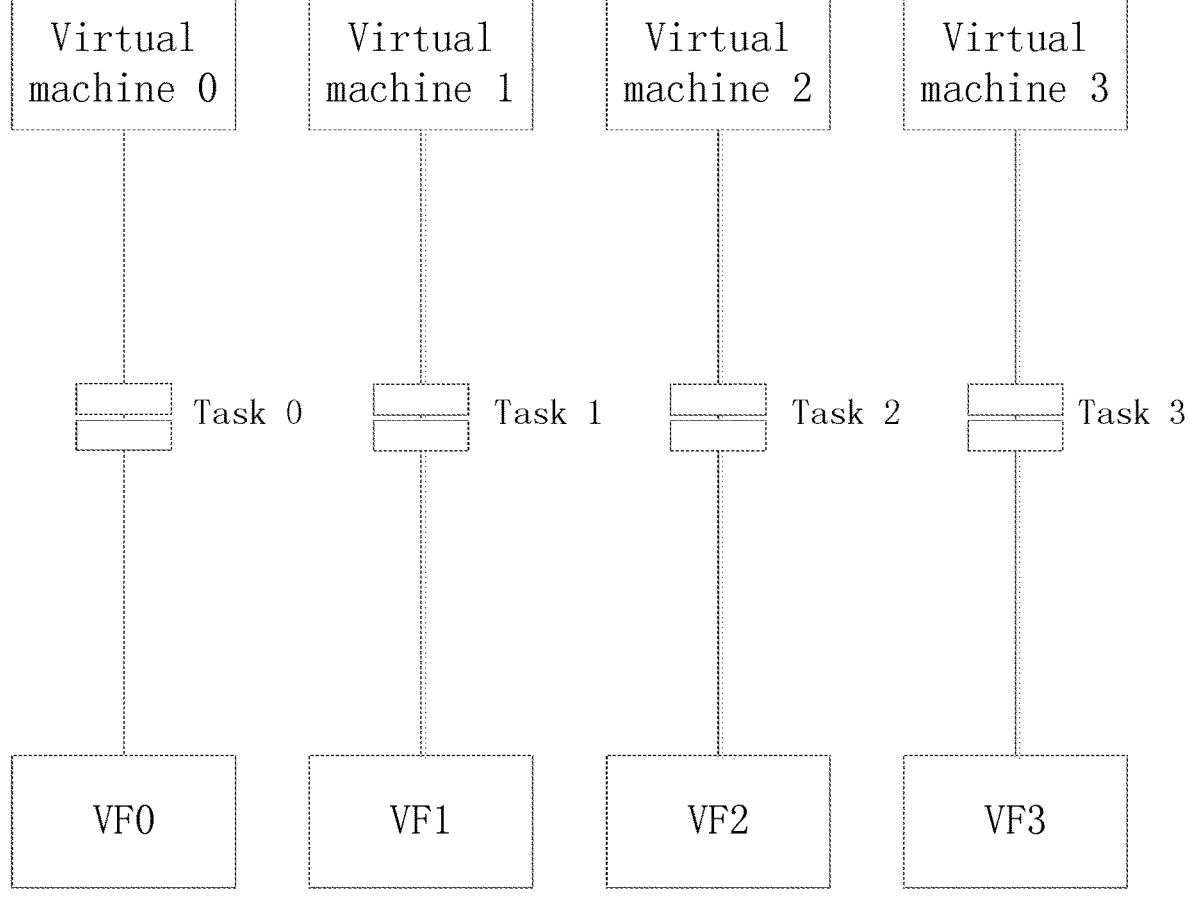
FIG. 20 is a virtualization system, according to an embodiment of the present disclosure.

FIG. 20 shows a virtualization system according to an embodiment of the present disclosure. The virtualization system includes a multi-core processor that includes a plurality of processing cores; a plurality of virtualization functionss VF0 to VF3, where each virtualization function corresponds to one or a plurality of processing cores; and a virtual machine (virtual machine 0 to virtual machine 3) that corresponds to the virtualization function.

The above methods and systems may be implemented through the SR-IVO (single root I/O virtualization) technology. The SR-IOV technology is a virtualization solution based on hardware, and the SR-IOV technology may provide the virtual solution with high performance and scalability. The SR-IOV develops a standardized mechanism to enable the plurality of virtual machines share the same I/O device. Therefore, PCIe (peripheral component interconnect express) device may be shared efficiently among virtual machines, and an I/O performance similar to this machine may be obtained.

The SR-IOV may be divided into the following two function types:

PF (physical function), which has a PCI function and is configured to support SR-IOV function, such as what is defined in SR-IOV norms; PF includes an SR-IOV functional structure that is configured to manage the SR-IOV function; PF is a full-featured PCIe function, and may discover, manage and process like any other PCIe devices; PF has fully configured resources and may be configured to allocate or control the PCIe device.

VF (virtual function), which is a function related to the PF; VF is a lightweight PCIe function, and may share physical resources with other VFs in the same PCIe device and PF; The VF only has the allocated resources for its own behavior.

Each SR-IOV device may have one PF, and each PF may have a plurality of VFs that may be related to the PF. Each VF may have one PCI memory space configured to map a register set of the VF. VF device driver may operate on the register set to enable a function of the register set, and realize the register set to an actual PCI device. After being created, the VF may be directly appointed to a guest virtual machine VM. Therefore, the VF may share the same physical device, and may perform data input and output when application software overhead is not managed by a CPU (central processing unit) and the virtual machine.

It should be understood that the above mentioned same physical device refers to different hardware resources on the same physical device. The physical device, for example, may be a multi-core processor, and the hardware resources may be different processing cores on the physical device.

This shows that there may be one or a plurality of virtual functions. When there is one virtual function, all the processing cores in the multi-core processor may be divided into single virtual function; and when there are a plurality of virtual functions, the virtual machines may operate independently. Operating independently means that each virtual machine is isolated from each other, and may operate without depending on other virtual machines, and may not be influenced by other virtual machines. Besides, isolation of the present disclosure is based on hardware, so that there is less interference among the virtual machines. Besides, independent operation means that each virtual machine adopts different operating system without affecting each other.

Virtual function may perform the same work as the multi-core processor. The virtual function is obtained through logical division of the multi-core processor. The virtual function may include one or a plurality of processing cores. The more the processing cores, the stronger the computation capability of the virtual function. All the processing cores may be divided to one virtual function.

As shown in FIG. 19 and FIG. 20, the virtual function may correspond to the virtual machine. For example, a virtual function VF0 may correspond to a virtual machine 0, a virtual function VF1 may correspond to a virtual machine 1, a virtual function VF2 may correspond to a virtual machine 2, and a virtual function VF3 may correspond to a virtual machine 3. It should be understood that the correspondence is only an example, and the present disclosure may also adopt other correspondence to make system deployment more convenient. This will be described in more detail later. Besides, even though four virtual functions and four virtual machines have been described in FIG. 20, the number of virtual functions and virtual machines may be less or more.

In the present disclosure, virtual machine may operate independently without interfering each other. Compared with the virtualization scheme that adopts time slicing technology in the prior art, technical solutions of the present disclosure adopts virtual machines that may operate independently, so that there is no HOL blocking, no adjacent noise, and no context switch overhead.

As shown in FIG. 17 and FIG. 18, in the multi-core processor, a certain number of processing cores constitute one processing cluster. Therefore, each virtual function may correspond to one or a plurality of processing clusters.

FIG. 21 is a schematic diagram of a correspondence between a virtual function and a processing cluster, according to an embodiment of the present disclosure. It should be understood that even though FIG. 21 describes four processing clusters (the processing cluster 0 to the processing cluster 3) as examples, the number of processing cluster is arbitrary.

In example 1 shown in FIG. 21, the processing cluster 0, the processing cluster 1, the processing cluster 2 and the processing cluster 3 correspond to the virtual function 0; in other words, the multi-core processor is divided to one virtual function.

In example 2 shown in FIG. 21, the processing cluster 0, the processing cluster 1, the processing cluster 2 correspond to the virtual function 0, and the processing cluster 3 corresponds to the virtual function 1; in other words, the multi-core processor is divided into two virtual functions, and the virtual function 0 may have stronger processing capacity compared with the virtual function 1.

In example 3 shown in FIG. 21, the processing cluster 0 and the processing cluster 1 correspond to the virtual function 0, and the processing cluster 2 and the processing cluster 3 correspond to the virtual function 1; in other words, the multi-core processor is divided into two virtual functions, and the virtual function 0 may have the same processing capacity with the virtual function 1.

In example 4 shown in FIG. 21, the processing cluster 0 and the processing cluster 1 correspond to the virtual function 0, the processing cluster 2 corresponds to the virtual function 1, and the processing cluster 3 corresponds to the virtual function 2; in other words, the multi-core processor is divided into three virtual functions, the virtual function 0 may have stronger processing capacity compared with the virtual function 1 and the virtual function 2, and the virtual function 1 and the virtual function 2 may have the same processing capacity.

In example 5 shown in FIG. 21, the processing cluster 0 corresponds to the virtual function 0, the processing cluster 1 corresponds to the virtual function 1, the processing cluster 2 corresponds to the virtual function 2, and the processing cluster 3 corresponds to the virtual function 3. These four virtual functions have the same processing capacity.

In example 6 shown in FIG. 21, the processing cluster 0 corresponds to the virtual function 0, and the processing cluster 1, the processing cluster 2 and the processing cluster 3 correspond to the virtual function 1. The virtual function 0 may have poorer processing capacity compared with the virtual function 0. This example is equivalent to example 2.

In example 7 shown in FIG. 21, the processing cluster 0 corresponds to the virtual function 0, the processing cluster 1 corresponds to the virtual function 1, the processing cluster 2 corresponds to the virtual function 0, and the processing cluster 3 corresponds to the virtual function 1. The virtual function 1 has the same processing capacity as the virtual function 2. This example is equivalent to example 3.

In example 8 shown in FIG. 21, the processing cluster 0 corresponds to the virtual function 0, the processing cluster 1 corresponds to the virtual function 1, the processing cluster 2 corresponds to the virtual function 0, and the processing cluster 3 corresponds to the virtual function 2. The virtual function 0 may have stronger processing capacity compared with the virtual function 1 and the virtual function 2, and the virtual function 1 and the virtual function 2 may have the same processing capacity. This example is equivalent to example 4.

This shows that flexible configuration of the virtual function may be realized through mapping different processing clusters to different virtual functions, so that the processing capability of the virtual function may be configured flexibly according to different demands. Therefore, compared with the prior art, the technical solutions of the present disclosure also have such advantages as simple configuration and flexibility.

According to another embodiment of the present disclosure, each virtual function has independent hardware resource.

The above mentioned hardware resources may be the processing core, or may be a memory (such as the DDR), a bus, an encoder/decoder, a video driver/audio driver, an interface unit, and the like. For example, PCIe board card resource includes AI computation unit (IPU), video processing unit (VPU), graphics processing unit (JPU) and the memory. The present disclosure will not put any limitation on the type of hardware resources.

Figure 22:
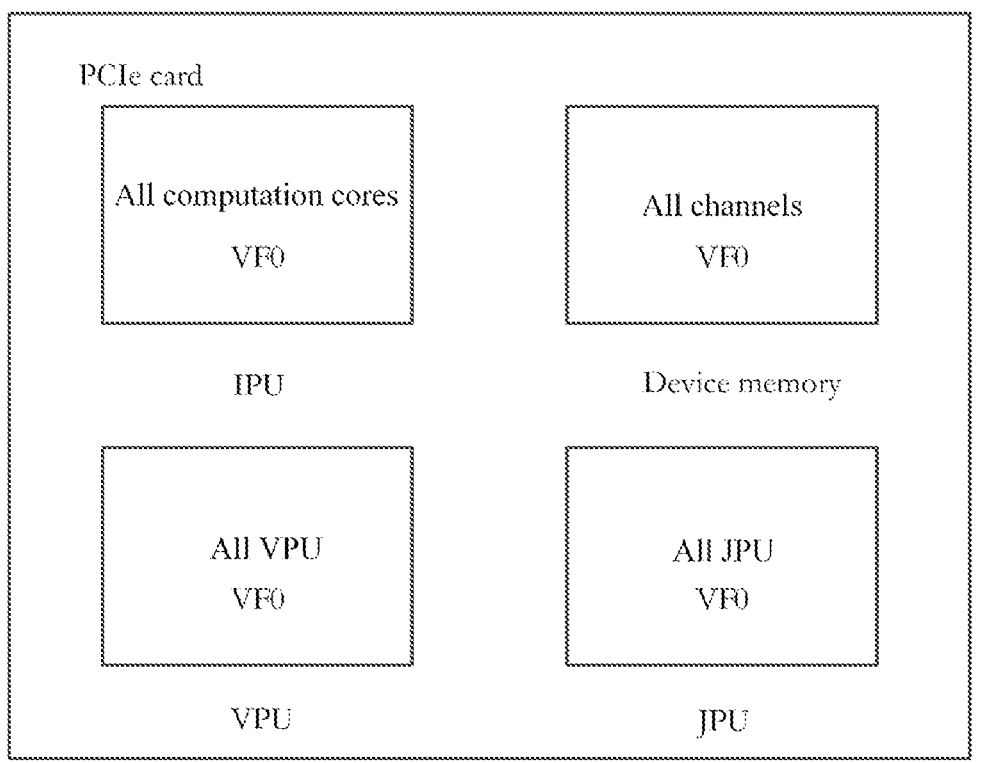
FIGS. 22, 23 and 24 exemplarily show resource consumption on the PCIe card of the multi-core processor when the multi-core processor is divided into one, two or four virtualization functions.
Figure 23:
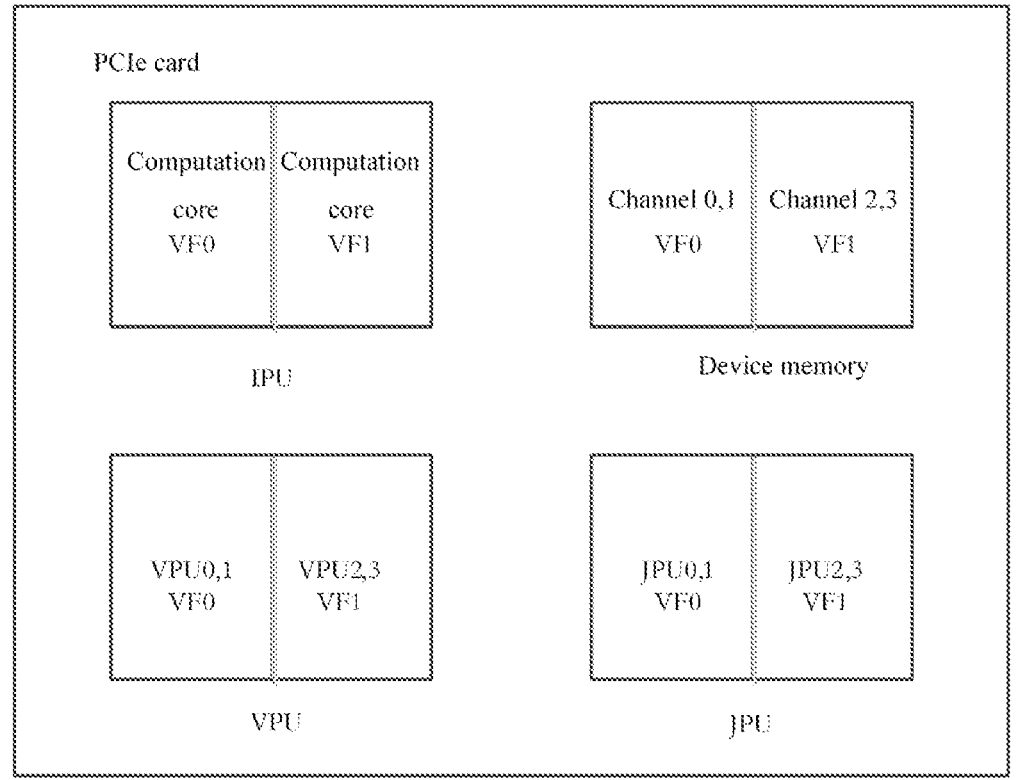
Figure 24:
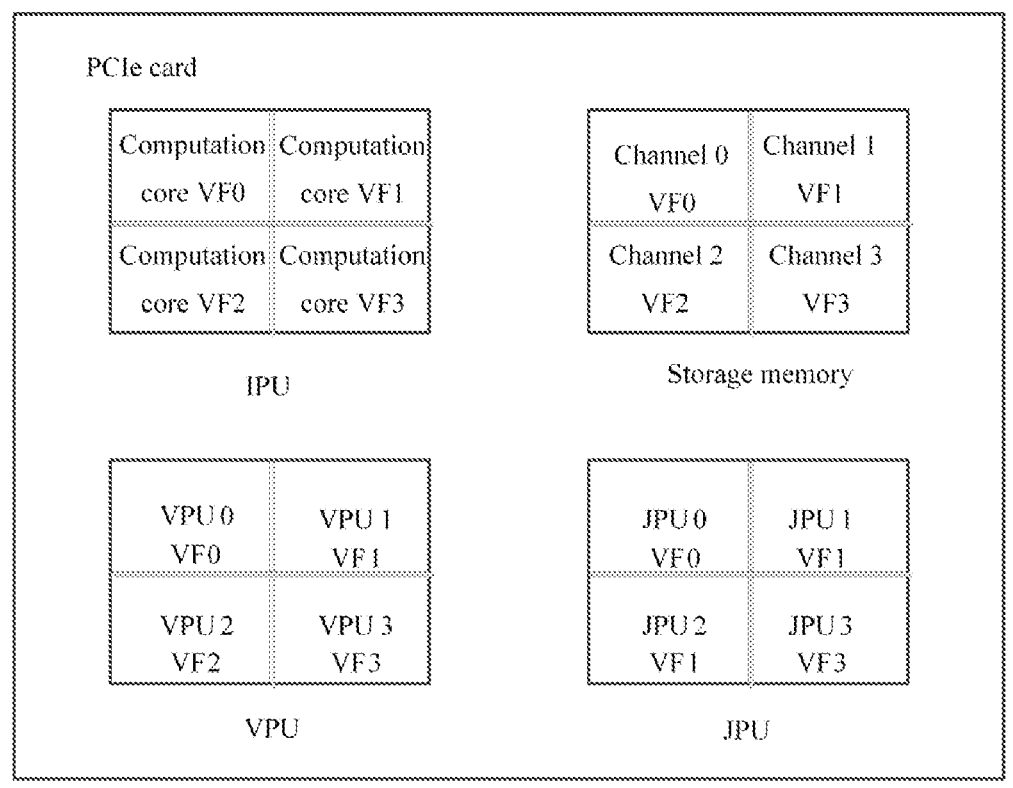

FIGS. 22, 23 and 24 exemplarily show resource consumption on the PCIe card of the multi-core processor when the multi-core processor is divided into one, two or four virtual functions. It should be noted that the above mentioned multi-core processor may be such multiple types of multi-core computation devices as JPU and VPU.

As shown in FIG. 22, when there is 1 virtual function, the virtual function VF0 may use all the resources; in other words, the virtual function may occupy all the computation cores, the channels, the VPUs and the JPUs.

As shown in FIG. 23, when there are two virtual functions, the virtual function VF0 and the virtual function VF2 may respectively occupy half of the resources; in other words, the VF0 may occupy half of the computation cores, and the VF1 may occupy the other half of the computation cores. If there are four DDR channels, the VF0 may occupy channel 0 and channel 1, and the VF1 may occupy channel 2 and channel 3. If there are four VPUs and JPUs, the VF0 may occupy VPU0 and VPU1, and the VF1 may occupy VPU2 and VPU3; the VF0 may occupy JPU0 and JPU1, and the VF1 may occupy JPU2 and JPU3.

As shown in FIG. 24, when there are four virtual functions, virtual functions VF0 to VF3 may respectively occupy a quarter of the computation core. Likewise, if there are four DDR channels, four VPUs and four JPUs, virtual functions VF0 to VF3 may respectively occupy channel 0 to channel 3; virtual functions VF0 to VF3 may respectively occupy VPU0 to VPU3; virtual functions VF0 to VF3 may respectively occupy JPU0 to JPU3.

Figure 25:
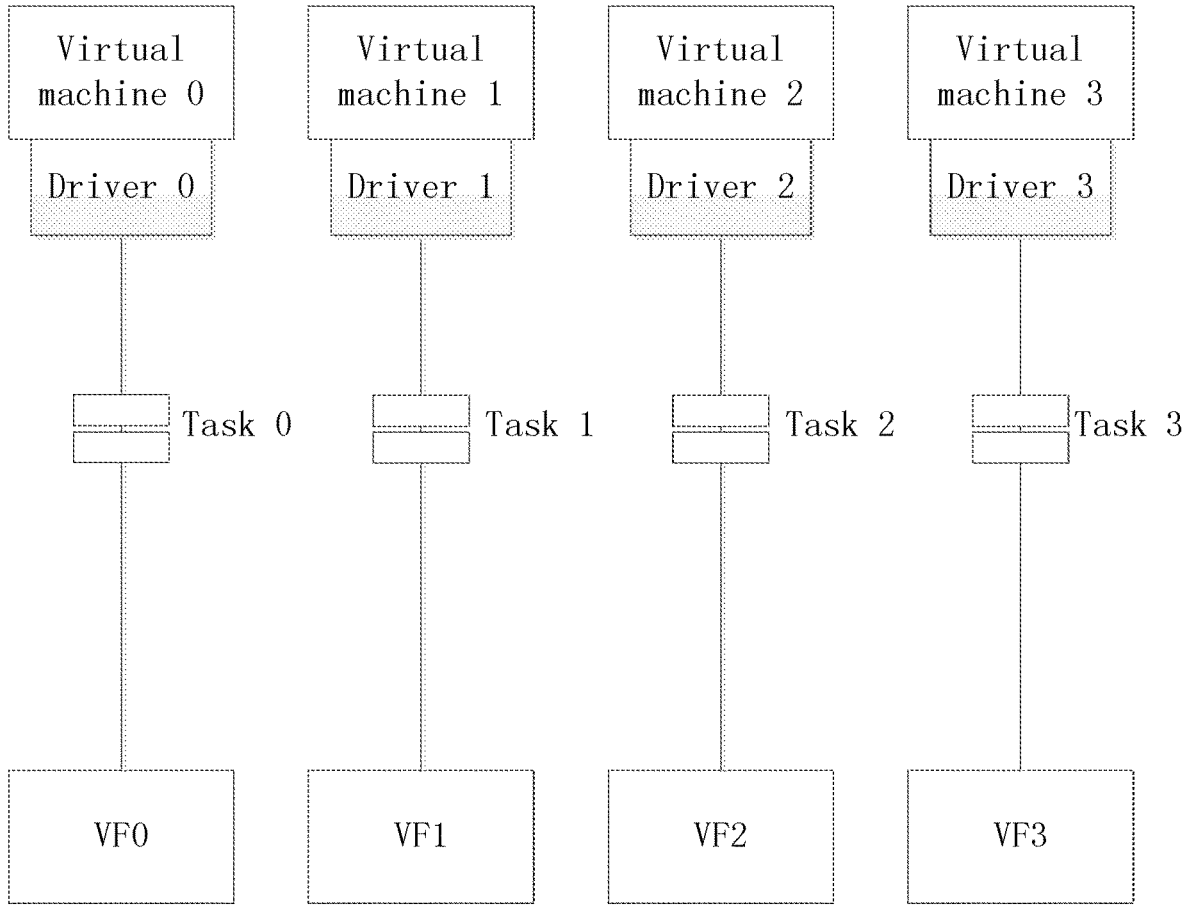
FIG. 25 is a schematic block diagram of a virtualization system, according to another embodiment of the present disclosure.

FIG. 25 is a schematic block diagram of a virtualization system according to another embodiment of the present disclosure.

As shown in FIG. 25, according to another embodiment of the present disclosure, the virtualization system of the present disclosure may further include a plurality of drivers, where the plurality of virtual functions are driven by different drivers.

According to an embodiment of the present disclosure, nodes corresponding to the virtual functions are established through the driver; in other words, the Guest includes the driver and the directory, so that each client machine needs to load the driver by its own, and create nodes, which are character-mode device, under the directory of the Guest.

Figure 26:
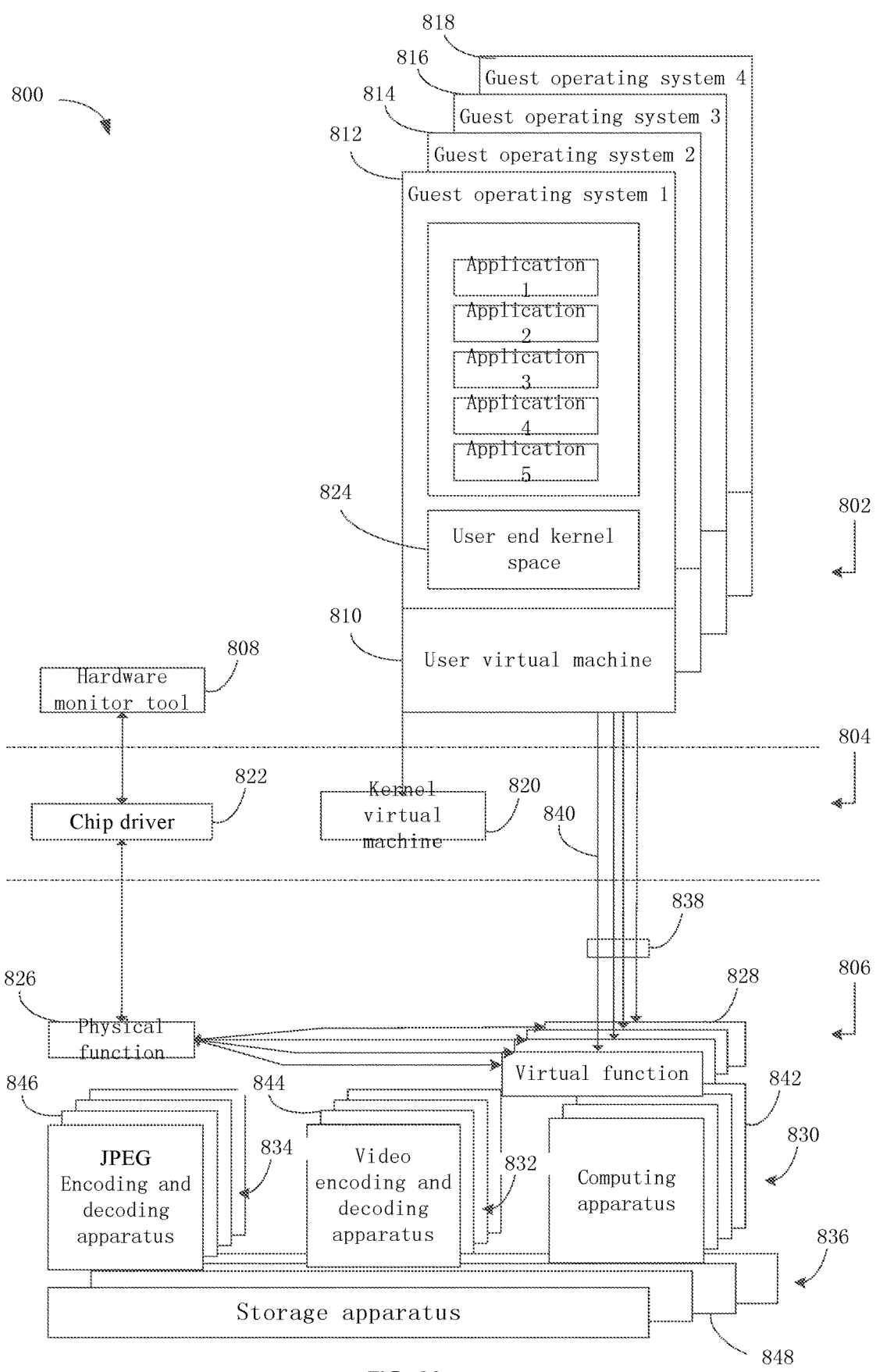
FIG. 26 is an exemplary structural diagram of a virtualization system.

FIG. 26 is an exemplary structural diagram of a virtualization system. The system in FIG. 26 adopts the virtual machine.

As shown in FIG. 26, a frame 800 includes a user space 802, a kernel space 804 and an on-chip system 806, and they are separated by dotted lines in the figure. The user space 802 is an operation space for user program, and may only perform easy computations. The user space 802 may not directly call the system resources, but may only give instructions to the kernel through a system interface. The kernel space 804 is an operation space of kernel codes, and the kernel space 804 may perform any instructions and may call any resources of the system. The on-chip system 806 is units of the artificial intelligence chip, and may collaborate with the user space 802 through the kernel space 804.

Unless particular emphasized, this embodiment is illustrated by the example of virtualizing one part into four virtual parts, but the present disclosure does not limit the number of virtual parts.

Before operating virtualization, the user space 802 is controlled by a hardware monitoring tool 808, and may obtain information of the on-chip system 806 through calling the interface. The hardware monitoring tool 808 may not only collect information of the on-chip system 806, but may obtain resource overhead on on-chip system 806 by upper software in real time, providing real-time detailed information and state of the current on-chip system 806 to the users. These detailed information and state may be dozens of types of data such as a hardware device model, a firmware version number, a driver version number, a device utilization, a storage apparatus overhead state, a board card power consumption, a board card peak power consumption and a PCIe (peripheral component interconnect express). Because of different versions and usage scenarios of the hardware monitoring tool 808, content and number of the monitored information may be different.

After the system starts virtualization, operations of the user space 802 may be took over by the user virtual machine 810. The user virtual machine 810 is abstraction and simulation of the real computation environment. The system may allocate a set of data structure to manage a state of the user virtual machine 810. The set of data structure includes a complete set of register, service condition of the physical memory, and the state of the virtual device, and the like. The physical space of the user space 802 of the embodiment is virtualized to four virtual spaces 812, 814, 816 and 818. These four virtual spaces are independent and will not influence each other, and may respectively carry different guest operating systems, such as the guest operating system 1, guest operating system 2, guest operating system 3 and guest operating system 4 shown in the figure. The guest operating system may be Windows, Linus, Unix, iOS, and Android, and different applications may be operated on different operating systems.

In this embodiment, the user virtual machine 810 is implemented through the quick emulator (QEMU). The QEMU is an open source virtualization software programmed in C language, and may virtualize the interface through a dynamic binary, and provide a series of hardware models to make the guest operating system 1, the guest operating system 2, the guest operating system 3 and the guest operating system 4 directly access the on-chip system 806. The user space 802 may include a processor, a memory, an I/O device and the like. The QEMU may virtualize the processor of the user space 802 to four virtual processors, and virtualize the memory to four virtual memories, and may also virtualize the I/O device to four virtual I/O devices. Each guest operating system may take part of the resources of the user space 802. For example, taking a quarter of the resources of the user space means that each guest operating system may respectively access a virtual processor, a virtual memory, and a virtual I/O device to perform a task of the guest operating system. Through this mode, the guest operating system 1, the guest operating system 2, the guest operating system 3 and the guest operating system 4 may operate independently.

The kernel space 804 carries a kernel virtual machine 820 and a chip driver program 822. The kernel virtual machine 820 is matched with the QEMU, and the main responsibility of the kernel virtual machine is to virtualize the kernel space 804 and the on-chip system 806 to make each guest operating system has its own address space when accessing the on-chip system 806. Particularly, space on the on-chip system 806 mapped to the guest operating system is a virtual component mapped to the process.

From the perspective of the user virtual machine 810, during the operation of the virtual machine, the QEMU calls the interface for kernel setup through the system provided by the kernel virtual machine 820. The QEMU uses the virtualization function of the kernel virtual machine 820, providing hardware virtualization acceleration for the virtual machine of the QEMU to improve the performance of the virtual machine. From the perspective of the kernel virtual machine 820, when the user may not directly interact with the kernel space 804, the manage tool of the user space 802 is required, so that the QEMU, a tool operating in the user space 802, may be required.

A chip driver program 822 is configured to drive a physical function 826. During the operation of the virtual machine, the user space 802 does not use a hardware monitor tool 808, but uses a chip drive program 822 to access an on-chip system 806. Therefore, the guest operating system 1, the guest operating system 2, the guest operating system 3 and the guest operating system 4 are respectively configured with the kernel space 824 to be loaded with the chip driver program 822, which enables each guest operating system drive the on-chip system 806.

The on-chip system 806 performs virtualization through the SR-IOV technology. In particular, the SR-IOV technology may be able to virtualize each component of the on-chip system 806. Therefore, each virtual component may has its corresponding unique accessible resource.

The on-chip system 806 of the embodiment includes hardware and firmware. The hardware includes an ROM (read only memory) that is not shown in the figure, and the ROM is configured to store the firmware. The firmware includes the physical function 826 to support or cooperate with the PCIe function of the SR-IOV, and the physical function 826 has the power to fully configure the PCIe resources. When implementing the SR-IOV technology, the physical function 826 may generate a plurality of virtual functions 828 through virtualization, and there are four virtual functions 828 in this embodiment. The virtual function 828 is a lightweight PCIe function that is managed by the physical function 826, and may share the PCIe physical resources with the physical function 826 and other virtual functions 828 related to the same physical function 826. The virtual function 828 is allowed to only control the resources configured to itself by the physical function 826

Once the SR-IOV is enabled in the physical function 826, each virtual function 828 may access its own PCIe configuration space through its bus, device and function number. Each virtual function 828 may have one memory space configured to map a register set of the virtual function 828. The virtual function 828 drive program operates on the register set to enable the function of the register set, and the function may be directly designated to the corresponding user virtual machine 810. Even the virtual function 828 is virtual, the user virtual machine 810 may consider 828 as a real PCIe device.

Hardware of the on-chip system 806 also includes a computation apparatus 830, a video encoding and decoding apparatus 832, a JPEG (joint photographic experts group) encoding and decoding apparatus 834, a storage apparatus 836 and a PCIe 838. In this embodiment, the computation apparatus 830 is IPU configured to execute convolution computation of the neural network; the video encoding and decoding apparatus 832 is configured to encode and decode video data; the JPEG encoding and decoding apparatus 834 is configured to encode and decode the static pictures that adopts the JPEG algorithm; the storage apparatus 836 may be the DRAM configured to store data; and PCIe 838 is the above mentioned PCIe. During the operation of the virtual machine, the PCIe 838 may be virtualized to four virtual interfaces 840. The virtual function 828 has a one to one correspondence with the virtual interface 840; in other words, the first virtual function corresponds to the first virtual interface, the second virtual function corresponds to the second virtual interface, and the like.

Through the SR-IOV technology, the computation apparatus 830 may be virtualized to four virtual computation apparatus 842, the video encoding and encoding apparatus 832 may be virtualized to four virtual video encoding and decoding apparatuses 844, the JPEG encoding and decoding apparatus 834 may be virtualized to four virtual JPEG encoding and decoding apparatuses 846, and the storage apparatus 836 may be virtualized to four virtual storage apparatuses 848.

Each guest operating system is configured with a set of virtual suite, and each set of the virtual suite includes a user virtual machine 801, a virtual interface 840, a virtual function 828, a virtual computation apparatus 842, a virtual video encoding and decoding apparatus 844, a virtual JPEG encoding and decoding apparatus 846 and a virtual storage apparatus 848. Each set of the virtual suite may operate independently without affecting each other, and the virtual suite is configured to perform the delivered tasks from the corresponding guest operating system, so as to make sure that each guest operating system may access the configured virtual computation apparatus 842, the virtual video encoding and decoding apparatus 844, the virtual JPEG encoding and decoding apparatus 846 and the virtual storage apparatus 848 through the configured virtual interface 840 and the virtual function 828.

Specifically, when performing tasks, each guest operating system may access different hardware in response to different tasks. For example, if one task is to perform computation, such as a matrix convolutional computation, the guest operating system may access the configured virtual computation apparatus 842 through the configured virtual interface 840 and the virtual function 828; if one task is to perform video encoding and decoding, the guest operating system may access the configured virtual video encoding and decoding apparatus 844 through the configured virtual interface 840 and the virtual function 828; if one task is to perform JPEG encoding and decoding, the guest operating system may access the configured virtual JPEG encoding and decoding apparatus 846 through the configured virtual interface 840 and the virtual function 828; and if one task is to read or write data, the guest operating system may access the configured virtual storage apparatus 848 through the configured virtual interface 840 and the virtual function 828.

The above describes a virtualization method based on the multi-core processor, and the virtualization method adopts the virtual machine. The following may adopt the docker-container method.

Figure 31:
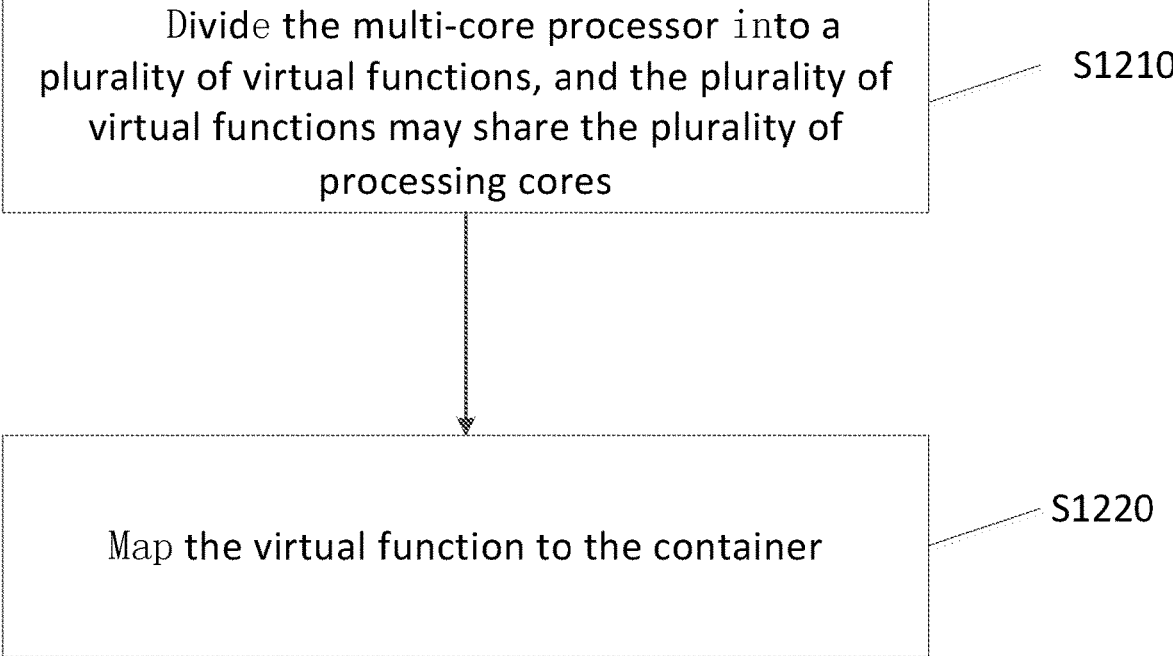
FIG. 31 is a virtualization method based on a multi-core processor, according to a first aspect of the present disclosure.

As shown in FIG. 31, the present disclosure provides a virtualization method based on the multi-core processor. The multi-core processor includes a plurality of processing cores. The method includes: dividing the multi-core processor to a plurality of virtual functions in operation 2-S1210, where the plurality of virtual functions may share the plurality of processing cores; and corresponding the virtual function to the container in operation 2-S1220.

Figure 32:
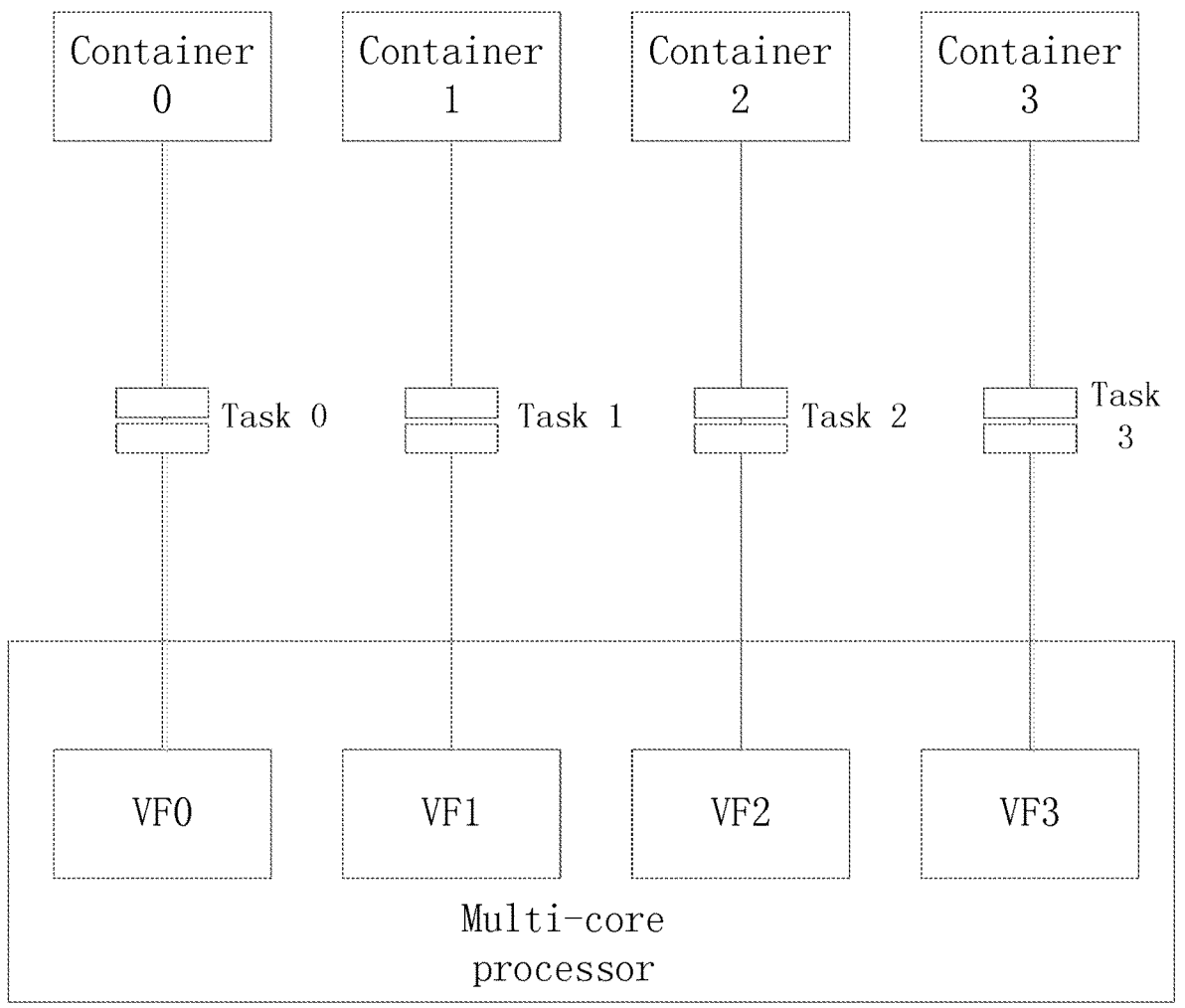
FIG. 32 is a virtualization system, according to an embodiment of the present disclosure.

FIG. 32 shows a virtualization system according to an embodiment of the present disclosure. The virtualization system includes a multi-core processor that includes a plurality of processing cores; a plurality of virtual functions that share the plurality of processing cores; and the container that corresponds to the virtual function.

As shown in FIG. 31 and FIG. 32, the virtual function may correspond to the container. For example, a virtual function VF0 may correspond to a container 0, a virtual function VF1 may correspond to a container 1, a virtual function VF2 may correspond to a container 2, and a virtual function VF3 may correspond to a container 3. It should be understood that the correspondence is only an example, and the present disclosure may also adopt other correspondence to make system deployment more convenient. This will be described in more detail later. Besides, even though four virtual functions and four containers have been described in FIG. 32, the number of virtual functions and containers may be less or more.

In the present disclosure, the container contains required hardware resources and software resources for task execution (such as task 0 to task 3), and the containers may operate independently without interfering each other. Compared with a virtualization solution that adopts time slicing technology in the prior art, the technical solution in the present disclosure adopts containers that operate independently, so that there may be no HOL blocking among containers, and the containers may not be affected by adjacent noise, and there is no context switch overhead.

As shown in FIG. 17 and FIG. 18, in the multi-core processor, a certain number of processing cores constitute one processing cluster. Therefore, the plurality of virtual functions may share one or a plurality of processing clusters.

FIG. 21 is a schematic diagram of a correspondence between a virtual function and a processing cluster, according to an embodiment of the present disclosure. It should be understood that even though FIG. 21 describes four processing clusters (a processing cluster 0 to a processing cluster 3) as examples, the number of processing cluster is arbitrary.

In example 1 shown in FIG. 21, the processing cluster 0, the processing cluster 1, the processing cluster 2 and the processing cluster 3 correspond to the virtual function 0; in other words, the multi-core processor is divided to one virtual function.

In example 2 shown in FIG. 21, the processing cluster 0, the processing cluster 1, the processing cluster 2 correspond to the virtual function 0, and the processing cluster 3 corresponds to the virtual function 1; in other words, the multi-core processor is divided into two virtual functions, and the virtual function 0 may have stronger processing capacity compared with the virtual function 1.

In example 3 shown in FIG. 21, the processing cluster 0 and the processing cluster 1 correspond to the virtual function 0, and the processing cluster 2 and the processing cluster 3 correspond to the virtual function 1; in other words, the multi-core processor is divided into two virtual functions, and the virtual function 0 may have the same processing capacity with the virtual function 1.

In example 4 shown in FIG. 21, the processing cluster 0 and the processing cluster 1 correspond to the virtual function 0, the processing cluster 2 corresponds to the virtual function 1, and the processing cluster 3 corresponds to the virtual function 2; in other words, the multi-core processor is divided into three virtual functions, the virtual function 0 may have stronger processing capacity compared with the virtual function 1 and the virtual function 2, and the virtual function 1 and the virtual function 2 may have the same processing capacity.

In example 5 shown in FIG. 21, the processing cluster 0 corresponds to the virtual function 0, the processing cluster 1 corresponds to the virtual function 1, the processing cluster 2 corresponds to the virtual function 2, and the processing cluster 3 corresponds to the virtual function 3. These four virtual functions have the same processing capacity.

In example 6 shown in FIG. 21, the processing cluster 0 corresponds to the virtual function 0, and the processing cluster 1, the processing cluster 2 and the processing cluster 3 correspond to the virtual function 1. The virtual function 0 may have poorer processing capacity compared with the virtual function 0. This example is equivalent to example 2.

In example 7 shown in FIG. 21, the processing cluster 0 corresponds to the virtual function 0, the processing cluster 1 corresponds to the virtual function 1, the processing cluster 2 corresponds to the virtual function 0, and the processing cluster 3 corresponds to the virtual function 1. The virtual function 1 has the same processing capacity as the virtual function 2. This example is equivalent to example 3.

In example 8 shown in FIG. 21, the processing cluster 0 corresponds to the virtual function 0, the processing cluster 1 corresponds to the virtual function 1, the processing cluster 2 corresponds to the virtual function 0, and the processing cluster 3 corresponds to the virtual function 2. The virtual function 0 may have stronger processing capacity compared with the virtual function 1 and the virtual function 2, and the virtual function 1 and the virtual function 2 may have the same processing capacity. This example is equivalent to example 4.

This shows that flexible configuration of the virtual function may be realized through making the plurality of virtual functions share one or a plurality of processing clusters, so that the processing capability of the virtual function may be configured flexibly according to different demands. Therefore, compared with the prior art, the technical solutions of the present disclosure also have such advantages as simple configuration and flexibility.

In the present disclosure, the plurality of virtual functions may share hardware resources, which may be the processing core, or may be a memory (such as the DDR), a bus, an encoder/decoder, a video driver/audio driver, an interface unit, and the like. For example, the resources of the PCIe board card includes artificial intelligence computation unit (IPU), video processing unit (VPU), graphics processing unit (JPU), and the memory. The present disclosure will not put any limitation on the type of hardware resources.

FIGS. 22, 23 and 24 exemplarily show resource consumption on the PCIe card of the multi-core processor when the multi-core processor is divided into one, two or four virtual functions. It should be noted that the above mentioned multi-core processor may be such multiple types of multi-core computation devices as JPU and VPU.

As shown in FIG. 22, when there is 1 virtual function, the virtual function VF0 may use all the resources; in other words, the virtual function may occupy all the computation cores, the channels, the VPUs and the JPUs.

As shown in FIG. 23, when there are two virtual functions, the virtual function VF0 and the virtual function VF2 may respectively occupy half of the resources; in other words, the VF0 may occupy half of the computation cores, and the VF1 may occupy the other half of the computation cores. If there are four DDR channels, the VF0 may occupy channel 0 and channel 1, and the VF1 may occupy channel 2 and channel 3. If there are four VPUs and JPUs, the VF0 may occupy VPU0 and VPU1, and the VF1 may occupy VPU2 and VPU3; VF0 may occupy JPU0 and JPU1, and VF1 may occupy JPU2 and JPU3.

As shown in FIG. 24, when there are four virtual functions, virtual function VF0 to VF3 may respectively occupy a quarter of the computation core. Likewise, if there are four DDR channels, four VPUs and four JPUs, virtual function VF0 to VF3 may respectively occupy channel 0 to channel 3; virtual function VF0 to VF3 may respectively occupy VPU0 to VPU3; virtual function VF0 to VF3 may respectively occupy JPU0 to JPU3.

Figure 33:
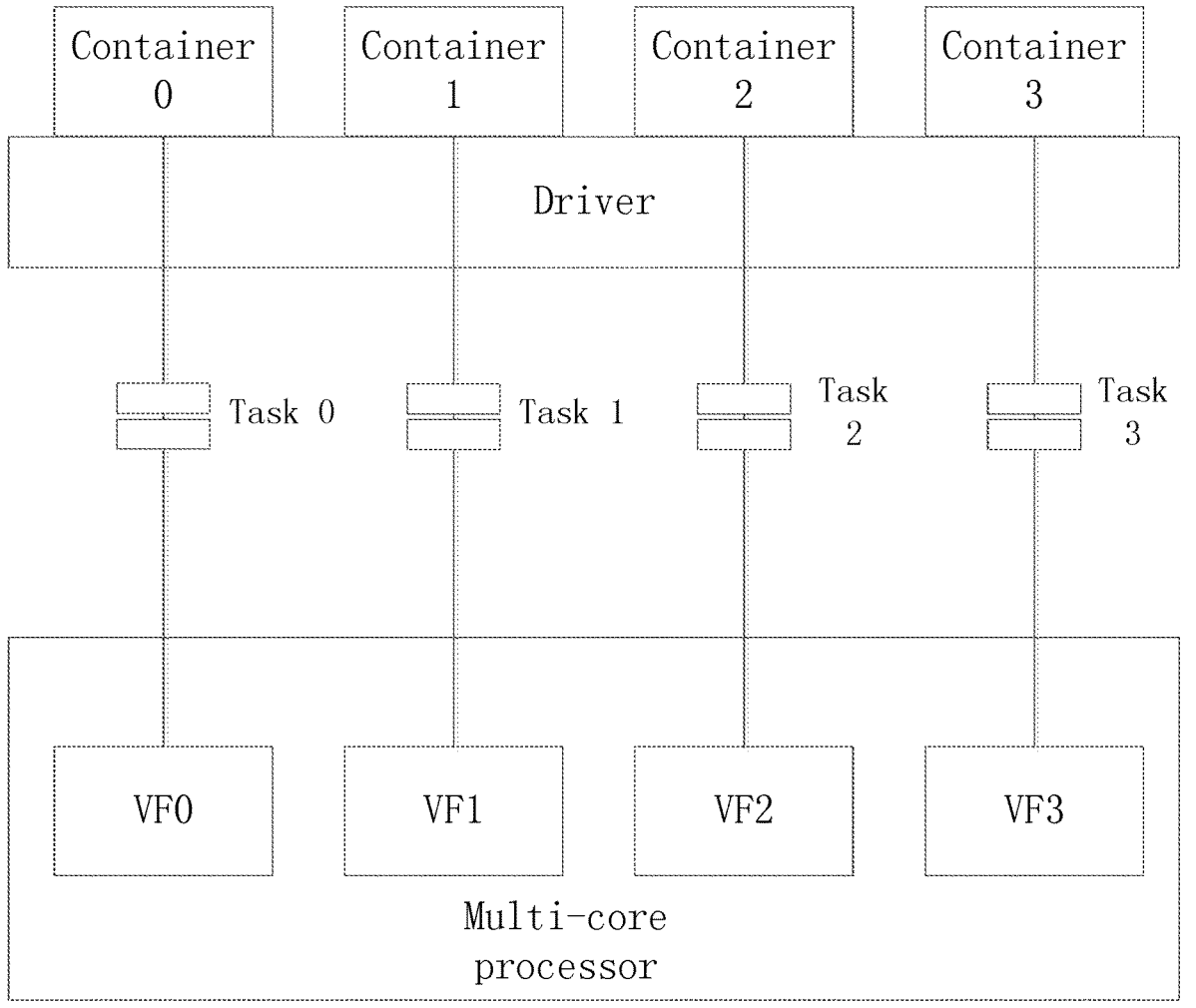
FIG. 33 is a schematic block diagram of a virtualization system, according to another embodiment of the present disclosure.

FIG. 33 is a schematic block diagram of a virtualization system according to another embodiment of the present disclosure.

As shown in FIG. 33, according to another embodiment of the present disclosure, the virtualization system of the present disclosure may further include a common driver, where the plurality of virtual functions are driven by the common driver.

The driver may be common to all the virtual functions, and may be a program installed in an operating system. The driver, for example, may establish corresponding nodes for each virtual function (VF). The node may be a document stored under a directory (such as a dev directory) to be operated or called by other applications. The name of the document may be different according to different manufactures.

After being created, one or a plurality of nodes may be included or correspond to corresponding containers. Each container may include one or a plurality of nodes, which means that each container may correspond or include one or a plurality of virtual functions. In the present disclosure, each container may correspond or include different numbers of nodes, so that configuration of the container may be more flexible, and deployment of the container may be more convenient. Besides, different virtual functions may have different computation capabilities, so that the design may be flexible according to demands.

After the container is established, the methods of the present disclosure may further include establishing one to one mirror for each container, and the mirror may communicate with the container. The above mentioned mirror may be established through the docker-container technology.

The mirror may be remotely installed to a client side, and the client may operate or call the container through the mirror, so as to call the multi-core processor and any other types of related resources.

Figure 29:
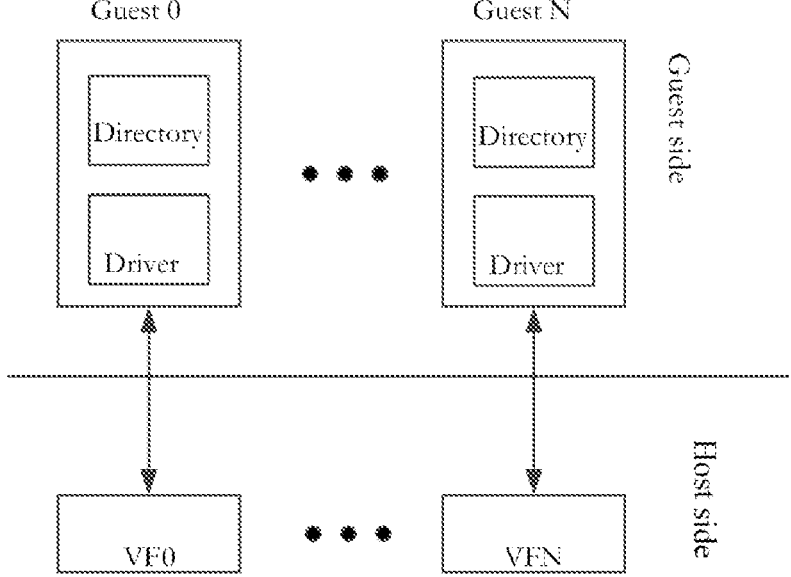
FIGS. 29 and 30 are comparison schematic diagrams between a virtual machine mode and a Docker mode.
Figure 30:
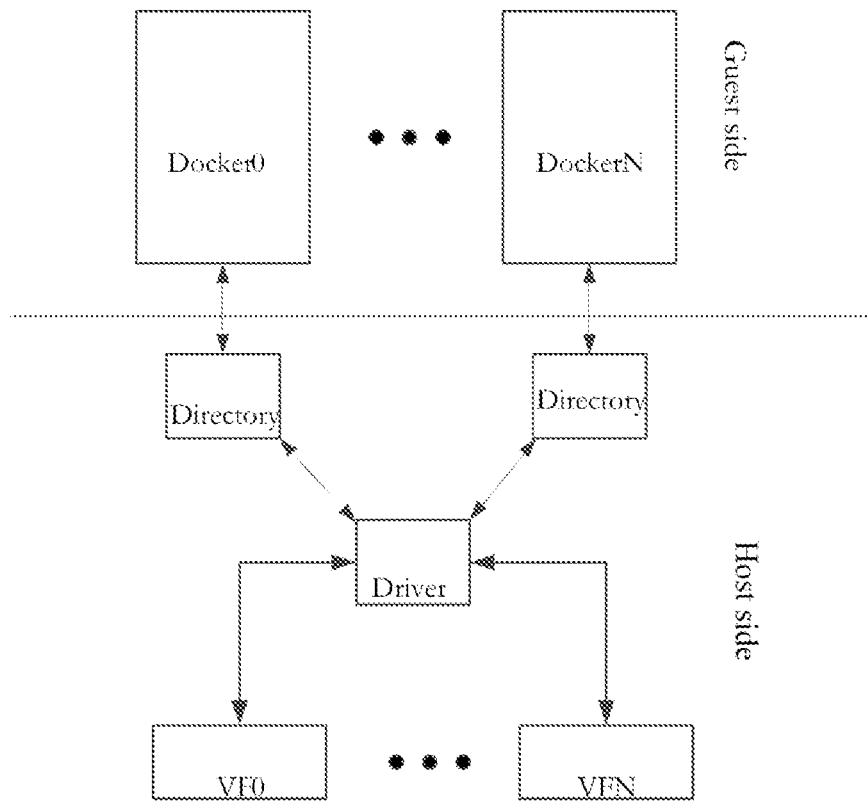

FIGS. 29 and 30 are comparison schematic diagrams between a virtual machine mode and a Docker-container mode.

In FIG. 29, under the virtual machine mode, a Host may pass through device in PCIe to a Guest, and the Guest includes a driver and a directory. Therefore, each Guest may need to load the driver itself, and create nodes, which are character devices, under the directory of the Guest.

In FIG. 30, under the Docker mode, the driver and the directory are all in the Host, so that only the Host is required to load the driver, and the driver is public to all the virtual functions. Therefore, the driver of the Host may create nodes, which are character devices, under the directory of the Host, and may pass the device to a mirror device; in other words, the device may be passed into the Docker. Therefore, compared with the virtual machine mode, the docker-container mode of the present disclosure does not require each Guest to install and load the driver, thereby simplifying setting of the system and making the use of the user more convenient.

Similar to the usage scenario of the hardware virtual machine, a lightweight virtualization solution based on the Docker is not only at the granularity of a whole card, but requires a plurality of containers at a fine granularity to share one or a plurality of physical accelerator cards. One or a plurality of VFs may be used in each Docker container. VFs in different containers may isolate from each other and work independently and safely.

Using the hardware virtualization solution of the SR-IOV may support the usage mode of the Docker at the same time, and may generate a plurality of VFs on the physical machine at the same time. The system administrator may designate different VFs to different containers according to demands. VFs belong to different containers may work independently without interfering each other. VF-to-VF has the same robustness and secure isolation as PF-to-PF. Compared with the virtual machine mode, the advantage of the Docker lies in quicker startup and less needed resources, and the Docker has a high utilization ratio of the system, which makes development, test, and deployment easier.

The present disclosure also provides a multi-core processor that includes a plurality of processing cores, where the multi-core processor is divided into a plurality of virtual functions, and each virtual function corresponds to one or a plurality of processing cores.

The present disclosure provides an electronic device, which includes the above mentioned virtualization system or the above mentioned multi-core processor. The electronic device may be a Host; in other words, the technical solution of the present disclosure may be realized in the Host, and may communicate with an external mirror (docker).

The SR-IOV function has a better tenant isolation and applies a heat transfer feature, which may provide safe and high-quality AI computation resources for cloud service providers to fully guarantee investment of users in the AI field.

The solutions of the present disclosure aims at a pain point of the user, which is how to use the AI computation resources efficiently.

Chip, apparatus, and electronic device that adopt solutions of the present disclosure may support a comprehensive AI inference scenario deployment including diversified artificial intelligence application such as visual, voice and natural language processing. Technical solutions of the present disclosure support diversified deployment scenarios such as data center, professional landscape and desktop deployment.

In these deployment scenarios, when facing cloud oriented deployment, diversified artificial intelligence inference and cooperating with an edge board card to perform application development, the first question that the users care is how to effectively utilize the AI computation resources, and this is also the core requirement of the function of the SR-IOV virtualization function of the present disclosure.

1) Facing cloud oriented deployment: under the cloud deployment environment, the cloud service provider (CSP) helps the massive tenants to provide computation, storage, network resources services in a cost-effective and highly available manner; based on this, the massive tenant may provide a high availability service level of up to 99.99 percent. Efficient sharing of resources from the Hypervisor and underlying hardware, as well as multi-tenancy and instance isolation from each other, are the basic requirements for AI cloud services.

2) Facing complicated artificial intelligence inference: when deploying AI application, the user may often meet scene with complicated business logic, and needs to construct an AI assistant decision-making system with the help of a plurality of network models. The deployment method of one machine multi-card is usually adopted to ensure service quality in the server nodes. However, when computation cost and quality service need to be considered at the same time, the users may hope to solve the problem through using a single board card to operate a plurality of models in parallel.

3) Facing edge application development and end application development: technical solutions of the present disclosure may realize complete coverage in three dimensions: cloud, edge and end. When developing applications facing edge and end, the users are always limited by CPU in deployment side, product form and network condition, and may not perform development on the final deployed device. Technical solutions of the present disclosure support using a development environment with end-cloud integration to help users apply applications as soon as possible. Allocating cloud computation resources efficiently and reasonably to the application development side is a goal of the present disclosure The SR-IOV function provided by the present disclosure may make AI cloud, business deployment and application development more flexible, efficient and safe.

The virtualization function adopted by the present disclosure allows a plurality of operating systems and application programs coexist on one physical computation platform and share computation resources of the same chip. The virtualization function provides sound security and isolation for users, and also supports such high-flexibility character as heat transfer. The virtualization technology is also helpful to improve density of cloud computation, and also makes IT asset management of the data center more flexible.

Except for basic resource sharing character of the virtualization, the SR-IOV virtualization technology of the present disclosure supports a plurality of examples operating on the cloud server to directly share hardware resources of the intelligence chip. A large amount of resources and time in traditional virtualization system have been consumed on Hypervisor or VMM software, so that performance advantage of the PCIe device may not be fully used. The value of the SR-IOV is to eliminate this software bottleneck, and help a plurality of virtual machines to realize efficient physical resource sharing.

Different from virtualization technology adopted by traditional vGPU of the graphics accelerator card, solutions of the present disclosure adopt a sharing method that is not based on time slicing. There is no performance loss brought by time slicing in switching context, so that service quality of each VF may be fully guaranteed, and these VFs may operate independently without affecting each other.

Besides, SR-IOV may also avoid performance cost brought by time-sharing switch. As shown in the figure above, when the virtualization function operates with the Docker or the virtual machine (VM), performance of single VF may maintained at over 91 percent of hardware performance. This makes the users make more accurate expectation to the quality of service of each VF without considering performance cost brought by congestion or switching when a plurality of models are operated in parallel.

The virtualization function based on the SR-IOV (such as vMLU) may provide better tenant isolation. The virtualization technology has been widely adopted by the data center, not only because the virtualization technology provides the capability of sharing resources (a better density performance), but also because the virtualization provides better isolation and security compared with other technologies (such as the docker). The SR-IOV virtualization technology of the present disclosure may help cloud users to realize better isolation, and specific advantages are as follows:

first, resources are independent and may not interfere each other, which may ensure the quality of service; besides, there is no HOL blocking; third, the virtualization technology has independent memory, so that each VF may not interfere each other; at last, the deployment is simple, and does not need to modify the component of the open source software.

The SR-IOV flat technology facing the Docker-container (such as shown in FIG. 31 to FIG. 33) in the present disclosure may provide high-efficient deployment method. Except for providing virtualization support to the virtual machine, technologies of the present disclosure also provide virtualization extension (SR-IOV flat mode) based on the SR-IOV to the docker-container. The SR-IOV flat mode is configured to make a plurality of containers have the computation ability to share one board card, and at the same time, the SR-IOV provides a management plug-in based on kubernetes. This function provides a lightweight deployment method for data center that does not have high requirement in isolation and security.

Compared with elastic GPUs shared pools, the SR-IOV flat technology adopted by the present disclosure has obvious advantages in isolation and QoS.

According to different application scenarios, the electronic device or apparatus may further include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

The present disclosure provides a computer-readable storage medium, on which computer program code is stored. The above mentioned method may be implemented when the computer program code is run by the processor.

The present disclosure may realize at least one of the following technical effects:

1. Adopting hardware isolation, which may greatly improve security. Even though problem occurs in one virtual function or container, normal operation of other parts may not be affected.

2. The QEMU does not need to be modified, thereby complexity of setting up the system is reduced.

3. Each part is relatively independent, so that there may be short latency and high QoS (quality of service).

4. No HOL blocking.

5. No adjacent noise.

6. No context switch overhead. Different from virtualization technology adopted by the traditional vGPU, the present disclosure adopts a sharing method that does not based on time slicing, eliminating performance overhead brought by context switch.

7. Easy to be extended and deployed.

Figure 27:
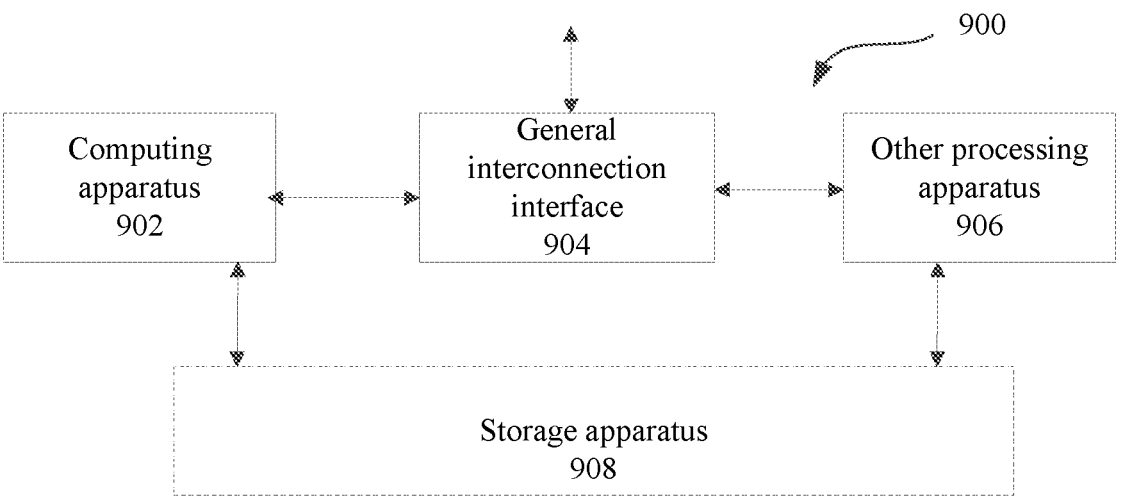
FIG. 27 is a schematic diagram of a combined processing apparatus of the present disclosure.

FIG. 27 shows a combined processing apparatus 900, which includes the above-mentioned computation apparatus 902 (such as the computation apparatus 830 and the like shown in FIG. 26), a general interconnection interface 904, and other processing apparatus 906. According to the present disclosure, the computation apparatus interacts with other processing apparatuses to jointly complete operations specified by the user. FIG. 27 is a schematic diagram of the combined processing apparatus.

Other processing apparatuses include one or more types of general-purpose/special-purpose processors such as a central processing unit (CPU), a graphics processing unit (GPU), a neural network processor, and the like. The present disclosure does not limit a count of processors included in other processing apparatuses. Other processing apparatuses may serve as an interface that connects a machine learning computation apparatus to external data and control including data moving, and may perform basic controls such as starting and stopping the machine learning computation apparatus; other processing apparatuses may also cooperate with the machine learning computation apparatus to complete computation tasks.

The general interconnection interface is configured to transfer data and control instruction between the computation apparatus (such as machine learning computation apparatus) and other processing apparatuses. The computation apparatus is configured to obtain required input data from other processing apparatuses and write the data in an on-chip storage apparatus of the computation apparatus. The computation apparatus may obtain a control instruction from other processing apparatuses, and write the control instruction in an on-chip control cache of the computation apparatus. The computation apparatus may further read data stored in a storage unit of the computation apparatus and transfer the data to other processing apparatuses.

Alternatively, the structure may also include a storage apparatus 908. The storage apparatus 908 is connected to the computation apparatus and other processing apparatuses respectively. The storage apparatus is configured to store data of the computation apparatus and other processing apparatuses, and is especially suitable for storing data that cannot be fully stored in the internal memory of the computation apparatus or other processing apparatuses.

The combined processing apparatus may be used as an SOC (system on chip) of a device including a mobile phone, a robot, a drone, a video surveillance device, and the like, thereby effectively reducing the core area of a control section, increasing the processing speed, and reducing the overall power consumption. In this case, the general interconnection interface of the combined processing apparatus may be connected to some components of the device. The components include, for example, a webcam, a monitor, a mouse, a keyboard, a network card, and a WIFI interface.

In some embodiments, the present disclosure provides a chip including the above mentioned computation apparatus or the combined processing apparatus.

Figure 28:
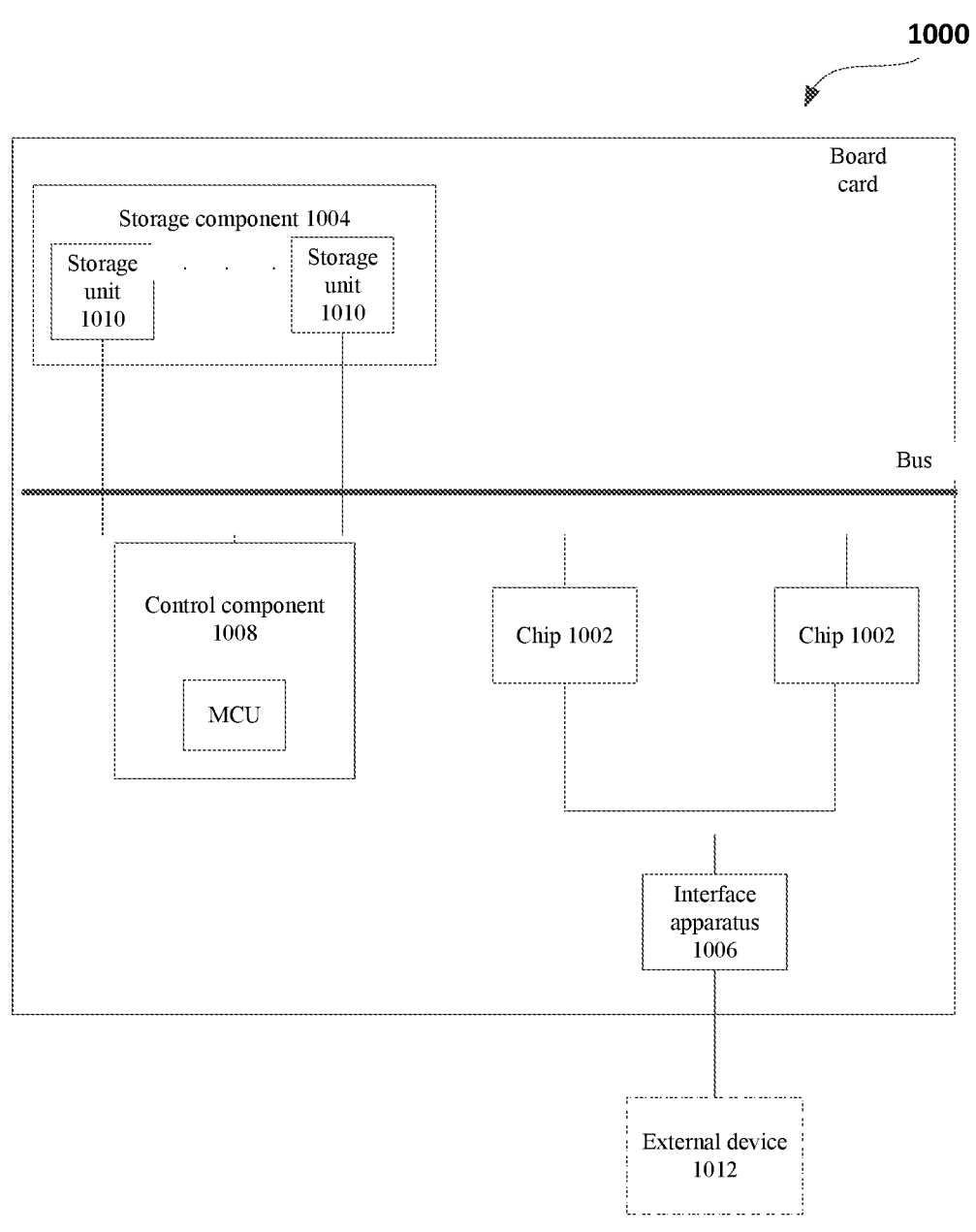
FIG. 28 is an exemplary block diagram of a board card of the present disclosure.

In some embodiments, the present disclosure also provides a board card, which includes the above mentioned chip. FIG. 28 provides an exemplary board card, which not only includes the above mentioned chip 1002, but also includes other supporting components. Other supporting components include but are not limited to a storage component 1004, an interface apparatus 1006, and a control component 1008.

The storage component is connected to the chip in the chip package structure through a bus, and the storage component is configured to store data. The storage component may include a plurality of groups of storage units 1010. Each group of the storage units is connected to the chip through a bus. It may be understood that each group of the storage unit may be a DDR SDRAM (double data rate synchronous dynamic random-access memory).

The DDR may double the speed of the SDRAM without increasing the clock frequency. The DDR allows data to be read on the rising and falling edges of the clock pulse. The speed of the DDR is twice the speed of a standard SDRAM. In an embodiment, the memory apparatus may include 4 groups of storage units. Each group of storage unit may include a plurality of DDR4 particles (chips). In an embodiment, four 72-bit DDR4 controllers may be arranged inside the chip, where 64 bits of each 72-bit DDR4 controller are for data transfer and 8 bits are for ECC (error checking and correcting) parity. In an embodiment, each group of the storage units include a plurality of DDR SDRAMs arranged in parallel. DDR may transfer data twice in one clock cycle. A controller for controlling the DDR is arranged in the chip to control data transfer and data storage of each storage unit.

The interface apparatus may be electrically connected to the chip inside the chip package structure. The interface apparatus is configured to implement data transfer between the chip and an external device 1012 (such as a server or a computer). For example, in an embodiment, the interface apparatus may be a standard PCIe (peripheral component interconnect express) interface. For instance, data to be processed may be transferred by a server through the standard PCIe interface to the chip, thereby realizing data transfer. In another embodiment, the interface apparatus may also be other interfaces. The present disclosure does not limit a specific form of expression of other interfaces as long as the interface unit may realize a transferring function. In addition, a computation result of the chip is still sent back to the external device (such as a server) by the interface apparatus.

The control component is electronically connected to the chip. The control component is configured to monitor a state of the chip. Specifically, the chip and the control component may be electrically connected through an SPI (serial peripheral interface). The control component may include an MCU (micro controller unit). For example, the chip may include a plurality of processing chips, a plurality of processing cores, or a plurality of processing circuits, and may drive a plurality of loads. Therefore, the chip may be in different working states such as multi-load working states and light-load working states. The control apparatus may realize regulation of working states of the plurality of processing chips, processing cores and/or processing circuits in the chip.

It should be noted that the above mentioned embodiments, for the sake of conciseness, are all described as a series of action combinations, but those skilled in the art should know that the present disclosure is not limited by the described order of action since some steps may be performed in a different order or simultaneously according to the present disclosure. Secondly, those skilled in the art should also understand that the embodiments described in the specification are all optional, and the actions and units involved are not necessarily required for the present disclosure.

In the above-mentioned embodiments, descriptions of each embodiment have their own emphasis. For parts that are not described in detail in an embodiment, reference may be made to related descriptions of other embodiments.

In some embodiments of the present disclosure, it should be understood that the apparatus of the present disclosure may be implemented in other manners. The apparatus embodiments described above are merely illustrative, for example, the division of the unit is only a division of a logical function. In a real implementation, there may be other manners for division. For example, a plurality of units or components may be combined or may be integrated into another system, or some features may be ignored or not performed. In addition, coupling or direct coupling or communication connection between each illustrated or discussed component may be indirect coupling or communication connection through some interfaces, apparatuses or units, and may be in the form of electrical, optical, acoustic, magnetic, and the like.

The units described as separate components may or may not be physically separated. The components shown as units may or may not be physical units. In other words, the components may be located in one place, or may be distributed into a plurality of network units. According to certain needs, some or all of the units may be selected for implementing the purposes of the embodiments of the present disclosure.

In addition, functional units in every embodiment of the present disclosure may be integrated into one processing unit, or each functional unit may be physically stand alone, or two or more functional units may be integrated into one unit. The integrated units above may be implemented in the form of hardware or in the form of software program unit.

When the integrated units are implemented in the form of a software program unit and sold or used as an independent product, the integrated units may be stored in a computer-readable memory. Based on such understanding, the technical solutions of the present disclosure may be embodied in the form of a software product that is stored in a memory. The computer software product includes several instructions to enable a computer device (which may be a personal computer, a server, or a network device, and the like) to perform all or part of the steps of the methods described in each embodiment of the present disclosure. The foregoing memory includes: a USB flash drive, a read-only memory (ROM), a random-access memory (RAM), a mobile hard disk, a magnetic disk, or an optical disc, and other media that may store program codes.

The embodiments of the present disclosure are described in detail before. Specific examples are used in the specification to explain the principles and implementations of the present disclosure. The descriptions of the above embodiments are only used to facilitate understanding of the methods and core ideas of the present disclosure. In addition, persons of ordinary skill in the art may change the implementation and application scope according to the ideas of the present disclosure. In summary, the content of this specification should not be construed as a limitation on the present disclosure.

The technical solutions of the present disclosure may be better understood through the following articles.

Article B1. A virtualization method based on a multi-core processor, wherein the multi-core processor includes a plurality of processing cores, and the method includes:

dividing the multi-core processor into a plurality of virtual functions, wherein each virtual function corresponds to one or a plurality of processing cores; and mapping the virtual function to a virtual machine.

Article B2. The method of article B1, wherein there are a plurality of virtual machines, and these virtual machines operate independently.

Article B3. The method of article B1 or article B2, wherein a certain amount of processor cores constitute a processing cluster, and each virtual function corresponds to one or a plurality of processing clusters.

Article B4. The method of any one of article B1 to article B3, wherein one virtual function corresponds to one virtual machine, or a plurality of virtual functions correspond to one virtual machine.

Article B5. The method of any one of article B1 to article B4, wherein each virtual function has independent hardware.

Article B6. The method of any one of article B1 to article B5, wherein the plurality of virtual functions are driven by different drivers.

Article B7. The method of article B6, wherein a node corresponding to each virtual function is established through the driver.

Article B8. A virtualization method based on a multi-core processor, wherein the multi-core processor includes a plurality of processing cores, and the method includes:

dividing the multi-core processor into a plurality of virtual functions, wherein the plurality of virtual functions share the plurality of processing cores; and mapping the virtual function to a container.

Article B9. The method of article B8, wherein there are a plurality of containers, and these containers operate independently.

Article B10. The method of article B8 or article B9, wherein a certain amount of processor cores constitute a processing cluster, and the plurality of virtual functions share one or a plurality of processing clusters.

Article B11. The method of any one of article B8 to article B10, wherein one virtual function corresponds to one container, or a plurality of virtual functions correspond to one container.

Article B12. The method of any one of article B9 to article B11, wherein the plurality of virtual functions are driven by a common driver.

Article B13. The method of article B12, wherein the node corresponding to each virtual function is established through the driver, and the container corresponds to one or a plurality of nodes.

Article B14. The method of any one of article B8 to article B13 further comprises establishing a one to one mirror for each container, and the mirror communicates with the container.

Article B15. A virtualization system, comprising:

a multi-core processor, wherein a multi-core processor includes a plurality of processing cores;

a plurality of virtual functions, wherein the plurality of virtual functions share the plurality of processing cores; and a virtual machine that corresponds to the virtual function.

Article B16. The virtualization system of article B15, wherein there are a plurality of virtual machines, and the plurality of virtual machines operate independently.

Article B17. The virtualization system of article B15 or article B16, wherein a certain amount of processor cores constitute a processing cluster, and the plurality of virtual functions share one or a plurality of processing clusters.

Article B18. The virtualization system of any one of article B15 to article B17, wherein one virtual function corresponds to one virtual machine, or a plurality of virtual functions correspond to one virtual machine.

Article B19. The virtualization system of any one of article B15 to article B18, wherein each virtual function has independent hardware.

Article B20. The virtualization system of any one of article B15 to article B19 further comprises a plurality of drivers, and the plurality of virtual functions are driven by different drivers.

Article B21. The virtualization system of article B22, wherein the driver is configured to establish nodes corresponding to the virtual functions.

Article B22. A virtualization system, comprising:

a multi-core processor that includes a plurality of processing cores;

a plurality of virtual functions that share the plurality of processing cores; and a container that corresponds to the virtual function.

Article B23. The virtualization system of article B22, wherein there are a plurality of containers, and these containers operate independently.

Article B24. The virtualization system of article B22 or article B23, wherein a certain amount of processing cores constitute a processing cluster, and the plurality of virtual functions share one or a plurality of processing clusters.

Article B25. The virtualization system of any one of article B22 to article B24, wherein one virtual function corresponds to one container, or a plurality of virtual functions correspond to one container.

Article B26. The virtualization system of any one of article B22 to article B25, wherein the plurality of virtual functions share hardware resources.

Article B27. The virtualization system of any one of article B22 to article B26 further comprises a common driver, and the plurality of virtual functions are driven by the common driver.

Article B28. The virtualization system of article B27, wherein the common driver is configured to establish a node corresponding to each virtual function, and the container corresponds to one or a plurality of nodes.

Article B29. The virtualization system of any one of article B22 to article B28 further comprises a mirror, wherein the mirror corresponds to the container one by one, and the mirror communicates with the container.

Article B30 A multi-core processor that includes a plurality of processing cores, wherein the multi-core processor is divided into a plurality of virtual functions, wherein the plurality of virtual functions share one or a plurality of processing cores.

Article B31. An electronic device that includes the virtualization system of any one of article B15 to article B29, or the multi-core processor of article B30.

Article B32. A computer-readable storage medium, on which computer program code is stored, and the method of any one of the article B1 to article B14 is implemented when the computer program code is operated by a processor. 202010358635.4

What is claimed:

1. A virtualization method based on a multi-core processor of a host, wherein the multi-core processor includes a plurality of processing cores, and the virtualization method comprises:

dividing the multi-core processor into a plurality of virtual functions, wherein each virtual function, of the plurality of virtual functions, corresponds to one or the plurality of processing cores;

mapping at least a first virtual function of the plurality of virtual functions to a first container of a plurality of containers;

mapping at least a second virtual function of the plurality of virtual functions to a second container of the plurality of containers, wherein the plurality of containers operates independently;

loading, by the host, a common driver only once, wherein the common driver loaded by the host is public to the first virtual function mapped to the first container and the second virtual function mapped to the second container, the first virtual function and the second virtual function do not require to load and install a respective driver in the first container and the second container, and the first virtual function and the second virtual function are driven by the common driver loaded by the host; and performing a computational task corresponding to each virtual function of the plurality of virtual functions based on the mapping and the loading of the common driver.

2. The virtualization method of claim 1, wherein a certain amount of processing cores of the plurality of processing cores constitutes a processing cluster, and each virtual function of the plurality of virtual functions corresponds to one or a plurality of processing clusters.

3. The virtualization method of claim 1, wherein each virtual function of the plurality of virtual functions has independent hardware resource, wherein the hardware resource includes at least one of a DDR, a bus, an encoder, a decoder, a video driver, an audio driver, or an interface unit.

4. The virtualization method of claim 1, wherein a node corresponding to each virtual function of the plurality of virtual functions is established through the common driver, and each container of the plurality of containers corresponds to one or a plurality of nodes.

5. The virtualization method of claim 1, further comprising:

establishing a one-to-one mirror for each container of the plurality of containers, wherein the one-to-one mirror communicates with a respective container of the plurality of containers.

6. A virtualization system, comprising:

a multi-core processor of a host, wherein the multi-core processor includes a plurality of processing cores;

a plurality of virtual functions, wherein each virtual function of the plurality of virtual functions corresponds to one or the plurality of processing cores; and a plurality of containers, wherein a first container of the plurality of containers is mapped to at least a first virtual function of the plurality of virtual functions, a second container of the plurality of containers is mapped to at least a second virtual function of the plurality of virtual functions, and the plurality of containers operates independently;

a common driver loaded by the host only once, wherein the common driver loaded by the host is public to the first virtual function mapped to the first container and the second virtual function mapped to the second container, the first virtual function and the second virtual function do not require to load and install a respective driver in the first container and the second container, and the first virtual function and the second virtual function are driven by the common driver loaded by the host; and each container, of the plurality of containers, performs a respective computation task corresponding to each virtual function of the plurality of virtual functions, based on the mapping and the loading of the common driver.

7. The virtualization system of claim 6, wherein a certain amount of processing cores, of the plurality of processing cores, constitutes a processing cluster, and each virtual function of the plurality of virtual functions corresponds to one or a plurality of processing clusters.

8. The virtualization system of claim 6, wherein each virtual function of the plurality of virtual functions has independent hardware resource, wherein the hardware resource includes at least one of a DDR, a bus, an encoder, a decoder, a video driver, an audio driver, or an interface unit.

9. The virtualization system of claim 6, wherein the common driver is configured to establish a node corresponding to each virtual function of the plurality of virtual functions, and each container of the plurality of containers corresponds to one or a plurality of nodes.

10. The virtualization system of claim 6, further comprising:

a mirror, wherein the mirror corresponds to each container of the plurality of containers one to one, and the mirror communicates with a respective container of the plurality of containers.

11. A multi-core processor of a host, comprising:

a plurality of processing cores, wherein the multi-core processor is divided into a plurality of virtual functions, each virtual function of the plurality of virtual functions corresponds to one or the plurality of processing cores, at least a first virtual function of the plurality of virtual functions is mapped to at least a first container of a plurality of containers, at least a second virtual function of the plurality of virtual functions is mapped to a second container of the plurality of containers, a common driver is loaded by the host only once, the common driver loaded by the host is public to the first virtual function mapped to the first container and the second virtual function mapped to the second container, the first virtual function and the second virtual function do not require to load and install a respective driver in the first container and the second container, the first virtual function mapped to the first container and the second virtual function mapped to the second container are driven by the common driver loaded by the host, and each container, of the plurality of containers, performs a respective computational task corresponding to each virtual function of the plurality of virtual functions, based on the mapping and the loading of the common driver.

* * * * *